(12) United States Patent
Morrow

(10) Patent No.: US 8,776,639 B2
(45) Date of Patent: Jul. 15, 2014

(54) SPUR GEAR POWER SHARING GEAR SETS

(75) Inventor: William Bruce Morrow, Santa Barbara, CA (US)

(73) Assignee: Harrier Technologies Inc., Greenwich, CT (US)

( * ) Notice: Subject to any disclaimer, the term of this patent is extended or adjusted under 35 U.S.C. 154(b) by 1056 days.

(21) Appl. No.: 12/803,390

(22) Filed: Jun. 24, 2010

(65) Prior Publication Data

US 2011/0314940 A1 Dec. 29, 2011

(51) Int. Cl.
 *F16H 37/06* (2006.01)

(52) U.S. Cl.
 USPC .................................... 74/665 GA

(58) Field of Classification Search
 USPC ............... 74/410, 412 R, 414, 665 A, 665 B, 74/665 GA, 665 GC, 665 GD, 665 N, 664, 74/665 G, 665 F, 665 R
 See application file for complete search history.

(56) References Cited

U.S. PATENT DOCUMENTS

| | | | | |
|---|---|---|---|---|
| 2,608,273 A | * | 8/1952 | Roos | 184/11.1 |
| 3,403,568 A | * | 10/1968 | Holcombe | 74/333 |
| 3,682,015 A | * | 8/1972 | Richardson | 74/377 |
| 3,766,797 A | * | 10/1973 | Hanslik et al. | 74/410 |
| 3,969,956 A | * | 7/1976 | Hanslik | 74/665 GD |
| 4,187,735 A | * | 2/1980 | Terry | 74/410 |
| 4,197,758 A | * | 4/1980 | Tetard | 74/410 |
| 4,442,728 A | * | 4/1984 | Jahnel | 74/361 |
| 4,829,850 A | | 5/1989 | Soloy | |
| 5,927,147 A | * | 7/1999 | Morrow | 74/410 |
| 6,173,621 B1 | * | 1/2001 | Halyak | 74/333 |
| 6,179,743 B1 | | 1/2001 | Morrow | |
| 6,189,397 B1 | | 2/2001 | Morrow et al. | |
| 6,360,626 B1 | * | 3/2002 | Funk et al. | 74/410 |
| 7,963,190 B2 | * | 6/2011 | Sullivan et al. | 74/640 |
| 2004/0079183 A1 | | 4/2004 | Willmot et al. | |
| 2010/0064832 A1 | | 3/2010 | Sullivan et al. | |

OTHER PUBLICATIONS

PCT International Search Report for PCT/US11/41649, having a date of mailing of Apr. 9, 2012.

* cited by examiner

*Primary Examiner* — Troy Chambers
*Assistant Examiner* — Jude Agendia
(74) *Attorney, Agent, or Firm* — Keith D. Nowak; Carter Ledyard & Milburn LLP

(57) ABSTRACT

In a gear transmission, pairs of spur drive gears provided with a helical cut spline on the inner diameter of the spur drive gears are mounted on a drive shaft provided with helical cut splines on the outer diameter of the drive shaft. The pairs of spur drive gears engage pairs of spur driven gears provided with a helical cut spline on the inner diameter of the spur driven gears mounted on a driven shaft provided with helical cut splines on the outer diameter of the driven shaft. In operation, there is equal load sharing among spur drive gears engaging the spur driven gears.

38 Claims, 7 Drawing Sheets

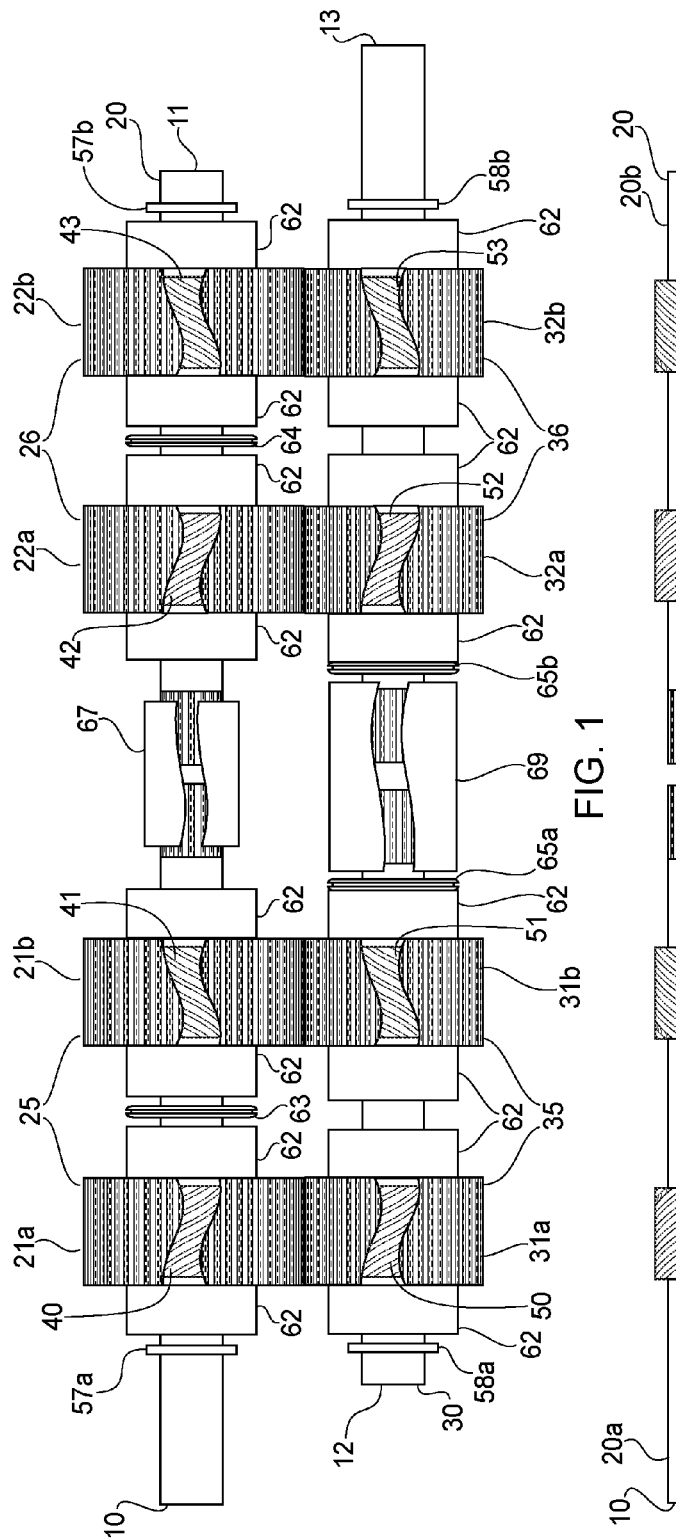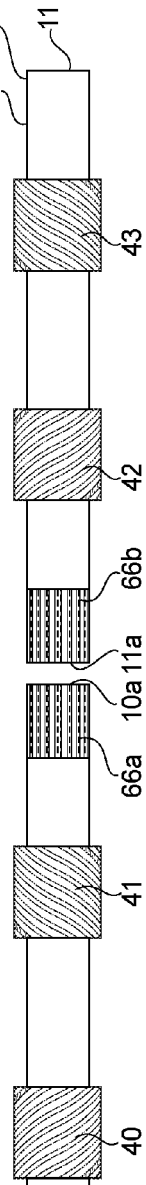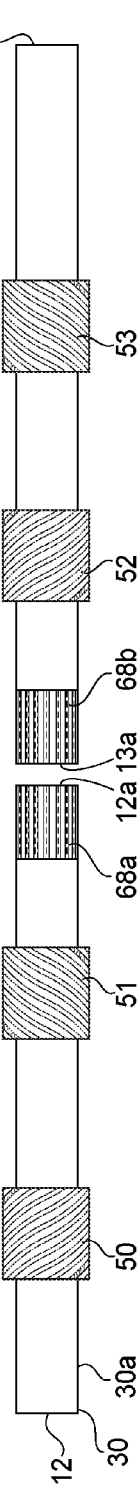

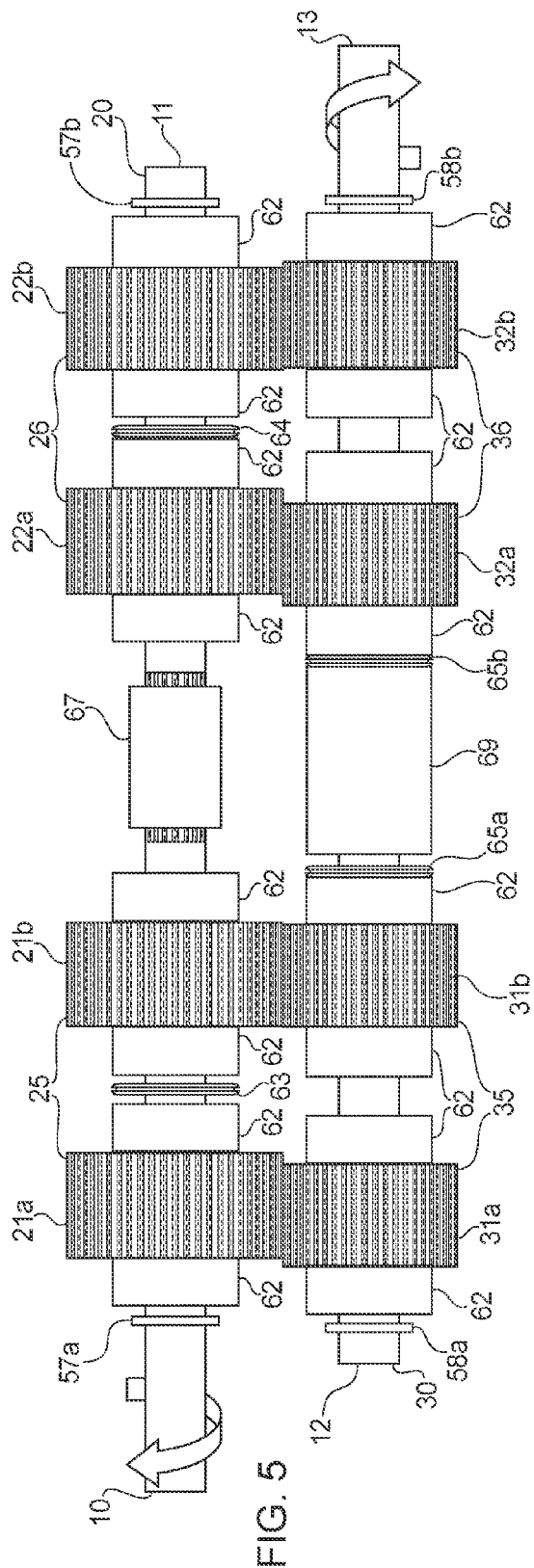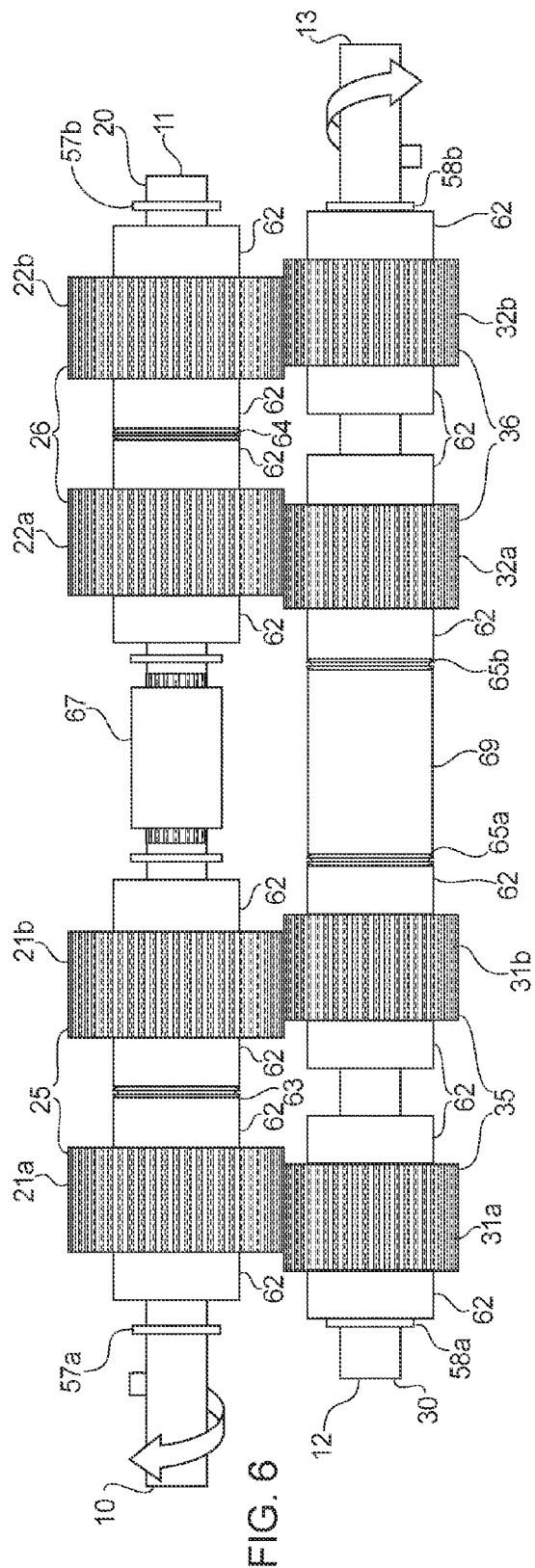

SPUR GEAR POWER SHARING GEAR SETS

FIELD OF THE INVENTION

The present invention is directed to improvements in load sharing amongst gears when multiple gears are mounted on a common shaft. More particularly, the present invention is directed to a gear transmission having pairs of spur gears mounted on a drive shaft equipped with helical cut splines, referred to herein as a 'spline helical cut drive shaft', for engagement with respective pairs of spur gears mounted on a driven shaft also equipped with helical cut splines, referred to herein as a 'spline helical cut driven shaft'. The spur gears have a helical cut splines on their inner diameters. The result is even load sharing amongst engaging spur gears.

BACKGROUND OF THE INVENTION

Transmissions that have constraints on the size of the diameter of gears due to space limitations, but which are also required to transmit significant power, have presented difficult design problems. An appealing concept for the solution to this problem is the use of multiple gears on a common shaft. The multiple engaging gears on a common drive shaft and a common driven shaft would transmit a relatively low load. However, the combined load transmitted by the multiple engaging gears on a common drive shaft and a common driven shaft would be relatively large. This apparent simple theoretical solution has proven to be impractical because of the difficulty in achieving even load sharing among engaging gears.

Due to gear manufacturing tolerances, multiple gears on a drive shaft are not likely to be perfectly aligned with the corresponding multiple gears on a driven shaft. When a load is applied, sets of engaging gears on the drive and driven shafts are not likely to simultaneously mate. This non-perfect alignment results in gears on the drive and driven shaft to engage unevenly. This results in one or more engaging sets of gears to be loaded higher than their design load with resulting premature failure due to excessive load or wear. Minor misalignments in the drive and driven shafts and shaft flex also are factors contributing to the uneven loading of engaging multiple gears on the drive and driven shafts.

Very precise tolerances were required to successfully construct a transmission having multiple gears on a common shaft. As is appreciated by one skilled in the art, the more precise the tolerances required, the greater are the manufacturing costs. Because of these tolerance-cost considerations, transmissions having multiple gears on a drive shaft and driven shaft were generally impractical.

This problem in prior art transmissions was first solved by the present inventor as disclosed in U.S. Pat. No. 5,927,147 to Morrow titled Power Sharing Gear Sets, the entire disclosure of which is incorporated by reference herein. U.S. Pat. No. 5,927,147 is directed to a gear transmission wherein pairs of helical gears (a helical gear being a gear having a helical cut on the outer diameter of the gear) are mounted on a drive shaft for rotation by the drive shaft and axial movement on the drive shaft. The pairs of helical gears mounted on the drive shaft engage corresponding pairs of helical gears mounted on a driven shaft for rotating the driven shaft and for axial movement on the driven shaft. U.S. Pat. No. 5,927,147 achieves even load sharing amongst engaging gears. U.S. Pat. No. 5,927,147 does not include the use of helical cut splines on the drive and driven shafts.

OBJECTS OF THE INVENTION

It is an object of the present invention to provide a gear transmission that can transmit high torque when space limitations in the intended operating environment of the transmission limits the diameter of the transmission gears.

It is a further object of the present invention to provide a transmission having sets of engaging spur gears mounted on a common spline helical cut drive shaft and a common spline helical cut driven shaft wherein each spur gear set, during operational power transmission, is evenly loaded; such even loading is attained without the need of precise manufacturing tolerances; and such even loading is attained by a mechanical design which is industrially practical and cost effective to manufacture.

It is yet another object of the present invention to provide a gear transmission having sets of engaging spur gears mounted on a common spline helical cut drive shaft and a common spline helical cut driven shaft wherein even loading of each spur gear set results in reduced wear on the spur gears, thus greatly extending periods between scheduled maintenance and down time for repair.

These and other objects of the present invention will become apparent from the following description and claims read in conjunction with the drawings.

SUMMARY OF THE INVENTION

The present invention is directed to a gear transmission having pairs of spur gears mounted on a spline helical cut drive shaft engaging pairs of spur gears mounted on a parallel spline helical cut driven shaft. In operation, the present invention obtains even load sharing among engaging and mating spur gears during power transmission.

In the present invention, a spur gear means a gear wherein all the gear teeth on the outer circumference of the gear are parallel to the center axis of the gear. In the present invention, each spur gear is a cylindrical type member. In accordance with the present invention, the inner diameter of each cylindrical member spur gear is provided with a helical cut.

In accordance with the present invention, the helical cut spline on the inner diameter of each spur gear engages a matching helical cut spline on the outer diameter of the drive or driven shaft. The angle of the helical cut spline on the inner diameter of a spur gear is equal to the angle of the helical cut spline on the outer diameter of the drive/driven shaft engaged by the helical cut on a respective spur gear.

The spur drive gears are mounted on the spline helical cut drive shaft for rotation by the drive shaft. The spur drive gears are also mounted on the spline helical cut drive shaft for axial movement on the spline helical cut drive shaft. The spur driven gears are mounted on the spline helical cut driven shaft for rotating the spline helical cut driven shaft as a result the spur driven gears being engaged and rotated by respective spur drive gears. The spur driven gears are also mounted on the spline helical cut driven shaft for axial movement on the spline driven shaft.

In one embodiment of the present invention, the spline helical cut drive shaft is rotated in the counter-clockwise direction. The angles of the helical cut on the inner diameter of spur drive gears mounted on the spline helical cut drive shaft have an opposite hand on adjacent spur drive gears of a spur drive gear pair such that adjacent spur drive gears of a spur drive gear pair are pushed together in the axial direction due to axial thrust caused by counter-clockwise rotation of the spline helical cut drive shaft. The angle of the helical cut on the inner diameter of the spur driven gears mounted on the spline helical cut driven shaft have an opposite hand on adjacent spur driven gears of a spur driven gear pair such that the adjacent spur driven gears of a spur driven gear pair separate and spread by movement of each spur driven gear in the spur driven gear pair in opposite axial directions due to axial thrust caused by mating with engaging spur drive gears. In one embodiment of the present invention, there can be one pair of spur drive gears mounted on the spline helical cut drive shaft and one pair of spur driven gears mounted on the spline helical cut driven shaft.

In another embodiment of the present invention, due to manufacture tolerances of the spur gears, upon the start of counter-clockwise rotation of the spline helical cut drive shaft, if there are more than one pair of spur drive gears/spur driven gears, one pair of spur drive gears on the spline helical cut drive shaft will establish tooth contact and begin transmitting torsional load to a corresponding engaging spur driven gear pair on the spline helical cut driven shaft and establish axial thrust forces due to the torsional loading prior to another spur gear pair so engaging. This first pair of spur drive gears on the spline helical cut drive shaft are pushed together in the axial direction due to axial thrust caused by the counter-clockwise rotation of the spline helical cut drive shaft. This first pair of spur driven gears on the spline helical cut driven shaft, which mate with a corresponding pair of spur drive gears on the spline helical cut drive shaft, start to spread with each adjacent spur driven gear of the spur driven gear pair moving axially on the spline helical cut driven shaft in opposite directions. Due to the spreading of this pair of spur driven gears on the spline helical cut driven shaft, there is no immediate rotation of this pair of spur driven gears on the spline helical cut driven shaft and no loading of the spline helical drive shaft.

Continued counter-clockwise rotation of the spline helical cut drive shaft causes a second pair of spur drive gears on the spline helical cut drive shaft to establish tooth contact with a second pair of engaging spur driven gears on the spline helical cut driven shaft. The pair of spur gears that is the second to engage is a function of the manufacturing tolerances of the gears. The pair of spur drive gears on the spline helical cut drive shaft of this second set of spur gear pairs are pushed together in the axial direction of the spline helical cut drive shaft due to axial thrust caused by the counter-clockwise rotation of the spline helical cut drive shaft. The pair of spur driven gears on the spline helical cut driven shaft of this second set of spur gear pairs start to spread and separate in the axial direction in the manner previously described.

Again, due to the spreading of the pair of spur driven gears on the spline helical cut driven shaft, there is no immediate rotation of the gears on the spline helical cut driven shaft and no appreciable loading of the spline helical cut drive shaft.

In accordance with the present invention, there can be multiple pairs of spur drive gears mounted on the spline helical cut drive shaft and corresponding multiple pairs of spur driven gears mounted on the spline helical cut driven shaft.

Counter-clockwise rotation of the spline helical cut drive shaft continues until all pairs of spur gears on the spline helical cut drive shaft and spline helical cut driven shaft engage, adjacent spur drive gears of all pairs of spur drive gears on the spline helical cut drive shaft are pushed together in the axial direction of the spline helical cut drive shaft, adjacent spur driven gears of all pairs of spur driven gears on the spline helical cut driven shaft start to spread in the axial direction of the spline helical cut driven shaft and the two outermost spur driven gears on the spline helical cut driven shaft are forced by this spreading against retainer members on the spline helical cut driven shaft. The counter-clockwise rotation of the spline helical cut drive shaft then becomes loaded and starts clockwise rotation of the spline helical cut driven shaft. The spur driven gear pairs on the spline helical cut driven shaft adjust their separation to balance load and the spur drive gear pairs on the spline helical cut drive shaft center themselves with their corresponding engaging and mating spread spur driven gear pairs on the spline helical cut driven shaft to balance load transmission.

The system is self balancing and there is even load sharing amongst all the spur gears.

It will be appreciated that, in accordance with the present invention, the spline helical cut drive shaft can be rotated in the clockwise direction and the spline helical cut driven shaft then rotates in the counter-clockwise direction. It will be further appreciated that, in accordance with the present invention, the adjacent spur drive gears of each pair of spur drive gears mounted on the spline helical cut drive shaft can separate and spread in the axial direction of the spline helical cut drive shaft and the adjacent spur driven gears of each pair of spur driven gears mounted on the spline helical cut driven shaft can be pushed together in the axial direction of the spline helical cut driven shaft. The principle of operation, in accordance with the present invention, would be the same.

BRIEF DESCRIPTION OF THE DRAWINGS

In the drawings forming part hereof:

FIG. 1 is a schematic view, with parts cut away, of one embodiment of a gear transmission in accordance with the present invention illustrating pairs of spur drive gears mounted on a spline helical cut drive shaft and pairs of spur driven gears mounted on spline helical cut driven shaft prior to commencement of rotation of the spline helical cut drive shaft;

FIG. 2 is a schematic view of one embodiment of a spline helical cut drive shaft in accordance with the present invention used in the embodiment of the gear transmission of the present invention illustrated in FIG. 1;

FIG. 3 is a schematic view of one embodiment of a spline helical cut driven shaft in accordance with the present invention used in the embodiment of the gear transmission of the present invention illustrated in FIG. 1;

FIG. 5 is a schematic view of the gear transmission of the embodiment of the present invention illustrated in FIG. 1 and FIG. 4 wherein rotation of the spline helical cut drive shaft has just commenced and one pair of spur driven gears on the spline helical cut driven shaft have engaged the corresponding pair of spur drive gears on the spline helical cut drive shaft and the spur driven gears of the spur driven gear pair have started separation in the axial direction of the spline helical cut driven shaft (distance of separation greatly exaggerated), this being prior to appreciable loading of spur driven gears on the spline helical cut driven shaft with resulting rotation of the spline helical cut driven shaft;

FIG. 6 is a schematic view of the gear transmission of the embodiment of the present invention illustrated in FIG. 1 and FIG. 4 wherein rotation of the spline helical cut drive shaft has proceeded to where both corresponding pairs of spur drive/driven gears on both the spline helical cut drive shaft and spline helical cut driven shaft are fully engaged and torsionally loaded to cause adjacent spur drive gears of both pairs of spur drive gears on the spline helical cut drive shaft to be pushed together in the axial direction of the spline helical cut drive shaft and to cause adjacent spur driven gears of both pairs of spur driven gears on the spline helical cut driven shaft to be separated in the axial direction of the spline helical cut driven shaft at a distance (distance of separation greatly exaggerated) resulting in even loading of the gears and rotation of the driven shaft;

DETAILED DESCRIPTION

Figure 4:
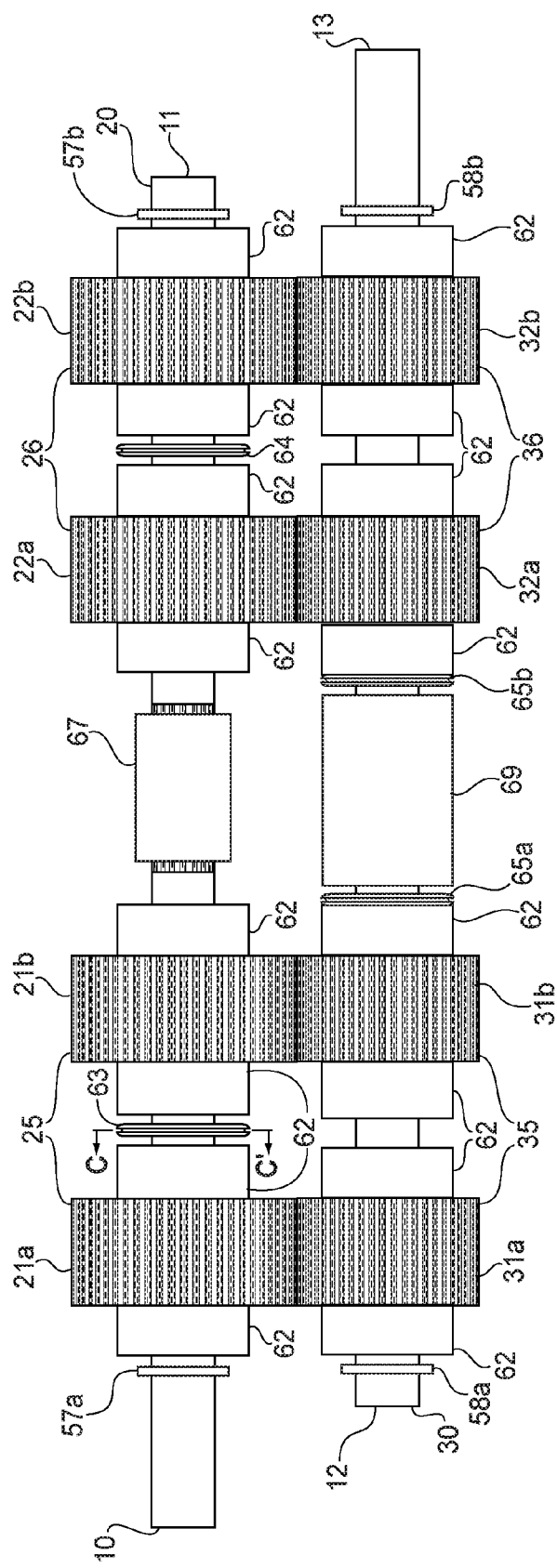
FIG. 4 is a schematic view of the embodiment of the gear transmission in accordance with the present invention illustrated in FIG. 1 prior to commencement of rotation of the spline helical cut drive shaft, without parts cut away.

In order to provide a more complete understanding of the present invention and an appreciation of its advantages, a detailed description of preferred embodiments is now provided with reference to the drawings.

FIGS. 1, 4, 5 and 6 schematically illustrate one embodiment of a spur gear transmission in accordance with the present invention. With reference to FIGS. 1, 4, 5 and 6, there is provided a spline helical cut drive shaft 20. Spline helical cut drive shaft 20 comprises two parts 20a and 20b, as shown in FIG. 2. Spline helical cut drive shaft part 20a has a first end 10 and a second end 10a. End 10 is adapted for connection with a drive mechanism (not illustrated) for rotation of the drive shaft 20. End 10a is equipped with a straight cut spline 66a on the outer surface or diameter of the shaft. Spline helical cut drive shaft part 20b has a first end 11a and a second end 11. First end 11a is equipped with a straight cut spline 66b on the outer surface of the shaft. Spline helical cut drive shaft parts 20a and 20b are joined torsionally by spline sleeve 67. Spline sleeve 67 is a cylindrical sleeve equipped with a straight cut spline on the inner surface that mates with the straight cut splines 66a and 66b. The two spline helical cut drive shaft parts 20a and 20b, joined by spline sleeve 67, act in rotation as a single piece drive shaft, and are commonly referred to herein as spline helical cut drive drive shaft 20 having a first end 10 and a second end 11. Located parallel to spline helical cut drive shaft 20 is spline helical cut driven shaft 30. Spline helical cut driven shaft 30 comprises of two parts 30a and 30b, as shown in FIG. 3. Spline helical cut driven shaft part 30a has a first end 12 and a second end 12a. End 12a is equipped with a straight cut spline 68a on the outer surface of the shaft. Spline helical cut driven shaft part 30b has a first end 13a and a second end 13. End 13 is adapted for connection with an output mechanism (not illustrated) for receiving output rotation and power. First end 13a is equipped with a straight cut spline 68b on the outer surface of the shaft.

Spline helical cut driven shaft parts 30a and 30b are joined torsionally by spline sleeve 69. Spline sleeve 69 is a cylindrical sleeve equipped with a straight cut spline on the inner surface that mates with the straight cut splines 68a and 68b. The two spline helical cut driven shaft parts 30a and 30b, joined by spline sleeve 69, act in rotation as a single piece driven shaft, and are commonly referred to herein as spline helical cut driven shaft 30 having a first end 12 and a second end 13.

Spline helical cut drive shaft 20 is split into two parts 20a and 20b, for the purpose of assembly of the gear train. That is, since the helical cut splines 40 and 41 on drive shaft part 20a are of opposite sense or hand, one cannot install drive gears 21a and 21b having a helical cut spline on the inner diameter from the same end. Gear 21a must be installed from end 10 of drive shaft part 20a and gear 21b must be installed from end 10a. Likewise, gear 22a must be installed on drive shaft part 20b from end 11a and gear 22b must be installed from end 11. A like situation exists for driven shaft 30, where the shaft must be split into two shaft parts 30a and 30b for assembly purposes. It is appreciate by one skilled in the art that if additional pairs of drive gears and corresponding driven gears are needed, those additional gears would be mounted on additional shaft parts joined by spline sleeves to the existing shaft parts, again to allow assembly of the additional pairs of gears, for the same reason as described above.

In the drawing figures, like part numbers correspond to like parts.

Mounted on spline helical cut drive shaft 20 for rotation by the drive shaft are a first pair of spur drive gears 25 comprising first spur drive gear half 21a and second spur drive gear half 21b. Also mounted on spline helical cut drive shaft 20 for rotation by the drive shaft are a second pair of spur drive gears 26 comprising first spur drive gear half 22a and second spur drive gear half 22b. The first and second pairs of spur drive gears 25, 26 are also mounted on spline helical cut drive shaft 20 for axial movement on spline helical cut drive shaft 20 in the axial direction of spline helical cut drive shaft 20. In accordance with the present invention, more than two pairs of spur drive gears could be mounted on spline helical cut drive shaft 20 for rotation by the drive shaft or one pair of spur drive gears could be mounted on spline helical cut drive shaft 20 for rotation by the drive shaft.

Mounted on spline helical cut driven shaft 30 for rotating the driven shaft are a first pair of spur driven gears 35 comprising a first spur driven gear half 31a and a second spur driven gear half 31b. Also mounted on spline helical cut driven shaft 30 for rotating the driven shaft are a second pair of spur driven gears 36 comprising a first spur driven gear half 32a and a second spur driven gear half 32b. The first and second pairs of spur driven gears 35, 36 are also mounted on spline helical cut driven shaft 30 for axial movement on spline helical cut driven shaft 30 in the axial direction of spline helical cut driven shaft 30. In accordance with the present invention, more than two pairs of spur driven gears could be mounted on spline helical cut driven shaft 30 for rotating spline helical cut driven shaft 30 or one pair of spur driven gears could be mounted on spline helical cut driven shaft 30 for rotating the driven shaft.

Pair of spur drive gears 25 engaging pair of spur driven gears 35 forms a first set of spur gears. Pair of spur drive gears 26 engaging pair of spur driven gears 36 from a second set of spur gears. Thus, a set of spur gears comprises a pair of spur drive gears mounted on the spline helical cut drive shaft engaging a pair of spur driven gears mounted on the spline helical cut driven shaft. It will be understood that the illustration of two sets of paired spur gears in the embodiment of FIGS. 1, 4, 5 and 6 of the drawings is by way of illustrative example and not by way of limitation. The actual number of sets of paired spur gears employed by one skilled in the art would be determined by the design requirements of the intended application. There could be one set of paired spur gears or a plurality of set of paired spur gears in accordance with the present invention.

Figure 7:
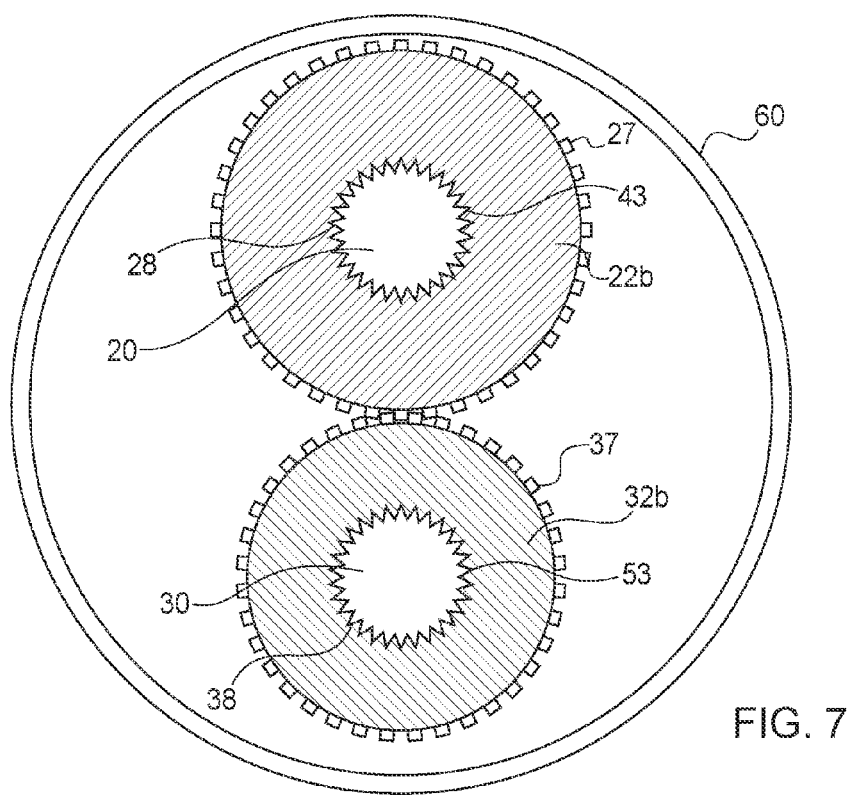
FIG. 7 is a schematic cross-sectional view along line A-A[1] of FIG. 4 with a housing schematically added.

In the present invention, a spur gear means a gear wherein all gear teeth on the outer circumference of the gear are parallel to the axis of the gear. See FIGS. 1, 4, 5 and 6 illustrating spur drive gear halves 21a, 21b, 22a, 22b and spur driven gear halves 31a, 31b, 32a, 32b. See FIG. 7, illustrating spur gear teeth 27 on the outer circumference of spur drive gear half 22b and spur gear teeth 37 on the outer circumference of spur driven gear half 32b.

In the present invention, each spur drive gear half and each spur driven gear half is a cylindrical type member. See FIG. 7 illustrating spur drive gear half 22b and spur driven gear half 32b. In accordance with the present invention, the inner diameter of each cylindrical member spur gear is provided with a helical cut spline. See FIG. 7 illustrating helical cut spline 28 on the inner diameter of spur drive gear half 22b and helical cut spline 38 on the inner diameter of spur driven gear half 32b. FIG. 7 illustrates helical cut spline 43 on spline helical cut drive shaft 20. Helical cut spline 28 on the inner diameter of spur drive gear half 22b engages helical cut spline 43 on spline helical cut drive shaft 20. FIG. 7 illustrates helical cut spline 53 on spline helical cut driven shaft 30. Helical cut spline 38 on the inner diameter of spur driven gear half 32b engages helical cut spline 53 on spline helical cut driven shaft 30. FIG. 7 also schematically illustrates a gear transmission housing 60 which would be routinely provided by one skilled in the art.

In accordance with the present invention, the helical cut spline on the inner diameter of each spur drive gear half and each spur driven gear half engages helical cut spline on the outer diameter of the drive or driven shaft.

FIG. 2 illustrates helical cuts splines 40, 41, 42, 43 on the outer diameter of spline helical cut drive shaft 20. FIG. 3 illustrates helical cuts splines 50, 51, 52, 53 on the outer diameter of spline helical cut driven shaft 30. See also FIG. 1 wherein drive spur gear halves 21a, 21b, 22a, 22b have been partially cut away to illustrate the helical cuts splines 40, 41, 42, 43 on spline helical cut drive shaft 20 and spur driven gear halves 31a, 31b, 32a, 32b have been partially cut away to illustrate the helical cuts splines 50, 51, 52, 53 on spline helical cut driven shaft 30.

In one embodiment of the present invention, with reference to spur drive gear pair 25, 35, spur drive gear pair 25 comprising spur drive gear half 21a and spur drive gear half 21b, each have a helical cut spline on the inner diameter at the same angle but in the opposite sense or hand to one another. The inner diameter helical cut spline of spur drive gear half 21a engages helical cut spline 40 on the outer diameter of spline helical cut drive shaft 20. The inner diameter helical cut spline of spur drive gear half 21b engages helical cut spline 41 on the outer diameter of spline helical cut drive shaft 20. In this embodiment of the present invention, helical cut spline 40 and helical cut spline 41 on the outer diameter of spline helical cut drive shaft 20 would have the same angle but in the opposite sense or hand to one another.

In this embodiment of the present invention, the angle of the inner diameter helical cut spline of spur drive gear half 21a would be the same as the angle of the helical cut spline 40 on the outer diameter of spline helical cut drive shaft 20. The angle of the inner diameter helical cut spline of spur drive gear half 21b would be the same angle as the angle of the helical cut spline 41 on the outer diameter of spline helical cut drive shaft 20.

Counter-clockwise rotation of spline helical cut drive shaft 20 will result in an axial thrust on spur drive gear half 21a and spur drive gear half 21b of spur drive gear pair 25 of the first set of spur gears to be directed inward pushing spur drive gear half 21a and spur drive gear half 21b toward one another tightly together in the axial direction of spline helical cut drive shaft 20. It will be appreciated by one skilled in the art that the inner diameter helical cut spline on spur drive gear half 21a and spur drive gear half 21b will enable spur drive gear half 21a to move in the axial direction on helical cut spline 40 on the outer diameter of spline helical cut drive shaft 20 and will enable spur drive gear half 21b to move in the axial direction on helical cut spline 41 on the outer diameter of spline helical cut drive shaft 20.

With further reference to spur driven gear pair 25, 35, spur driven gear pair 35 comprising spur driven gear half 31a and spur driven gear half 31b, each have a helical cut spline on the inner diameter at the same angle but in the opposite sense or hand to one another. The inner diameter helical cut spline of spur driven gear half 31a engages helical cut spline 50 on the outer diameter of spline helical cut driven shaft 30. The inner diameter helical cut spline on spur driven gear half 31b engages helical cut spline 51 on the outer diameter of spline helical cut driven shaft 30. In this embodiment of the present invention, helical cut spline 50 and helical cut spline 51 on the outer diameter of spline helical cut driven shaft 30 would have the same angle but in the opposite sense on hand to one another.

In this embodiment of the present invention, the angle of the inner diameter helical cut spline of spur driven gear half 31a would be the same angle as the angle of the helical cut spline 50 on the outer diameter of spline helical cut driven shaft 30. The angle of the inner diameter helical cut spline of spur driven gear half 31b would be the same as the angle of the helical cut spline 51 on the outer diameter of spline helical cut driven shaft 30.

In this embodiment of the present invention, the angle and sense or hand of the inner diameter helical cut spline of spur drive gear half 21a is the same as the angle and sense or hand of the inner diameter helical cut spline on spur driven gear half 31a. The angle and sense or hand of the inner diameter helical cut spline of spur drive gear half 21b is the same as the angle and sense or hand of the inner diameter helical cut spline on spur driven gear half 31b.

Counter-clockwise rotation of spline helical cut drive shaft 20 and thus counter-clockwise rotation of spur drive gear half 21a and spur drive gear half 21b will result in engagement with spur driven gear half 31a and spur driven gear half 31b such that spur driven gear half 31a and spur driven gear half 31b separate with respect to one another in the axial direction of spline helical cut driven shaft 30. It will be appreciated by one skilled in the art that the inner diameter helical cut splines on spur driven gear half 31a and spur driven gear half 31b will enable spur driven gear half 31a to move in the axial direction on helical cut spline 50 on the outer diameter of spline helical cut driven shaft 30 and will enable spur driven gear half 31b to move in the axial direction on helical cut spline 51 on the outer diameter of spline helical cut driven shaft 30.

In the described embodiment, counter-clockwise rotation of spline helical cut drive shaft 20 will eventually cause clockwise rotation of spline helical cut driven shaft 30.

In accordance with another embodiment of the present invention (not illustrated), spline helical cut drive shaft 20 could be rotated in the clockwise direction establishing axial thrusts which cause spur drive gear halves 21a and 21b to separate in the axial direction of spline helical cut drive shaft 20 and spur driven gear halves 31a and 31b to be pushed together in the axial direction of spline helical cut driven shaft 30. It will also be apparent to one skilled in the art that the sense or hand of the helical cuts on the inner diameter of spur drive gear halves 21a, 21b and spur driven gear halves 31a, 31b could be reversed or made opposite and the spline helical cuts 40, 41 on the spline helical cut drive shaft 20 and the spline helical cuts 50, 51 on the spline helical cut driven shaft 30 could be reversed or made opposite and the described principle of operation, in accordance with the present invention, would apply.

The foregoing description with respect to the first set of spur gears comprising pair of spur drive gears 25 and pair of spur driven gears 35 applies to the second set of spur gears comprising pair of spur drive gears 26 and pair of spur driven gears 36. One skilled in the art can employ as many sets of spur gears as would be determined by the design requirements of the intended application.

With yet further reference to the drawings, it will be appreciated by one skilled in the art that the outer diameter of the spur drive gears on the spline helical cut drive shaft 20 is larger than the outer diameter of the spur driven gears on the spline helical cut driven shaft 30. Thus, the embodiment of the present invention illustrated in the drawings is a step up gear transmission. It will be further appreciated by one skilled in the art that the outer diameter of the spur drive gears on the spline helical cut drive shaft 20 could be smaller than the outer diameter of the spur driven gears on the spline helical cut driven shaft 30, with this embodiment of the present invention (not illustrated) being a step down gear transmission. As illustrated, the outer diameter of all spur drive gears on the spline helical cut drive shaft is the same and the outer diameter of all spur driven gears on the spline helical cut driven shaft is the same.

The helical cut splines could be provided on the outer diameter of the spline helical cut drive shaft and spline helical cut driven shaft when the drive shaft/driven shaft are being machined. One skilled in the art could devise other ways to provide the helical cut splines on the outer diameter of the spline helical cut drive shaft and spline helical cut driven shaft. The helical cut spline on the inner diameter of the cylindrical type member spur gears could be provided when the spur gears are machined. One skilled in the art could devise other ways to provide the helical cut spline on the inner diameter of the cylindrical type member spur gears.

Figure 8:
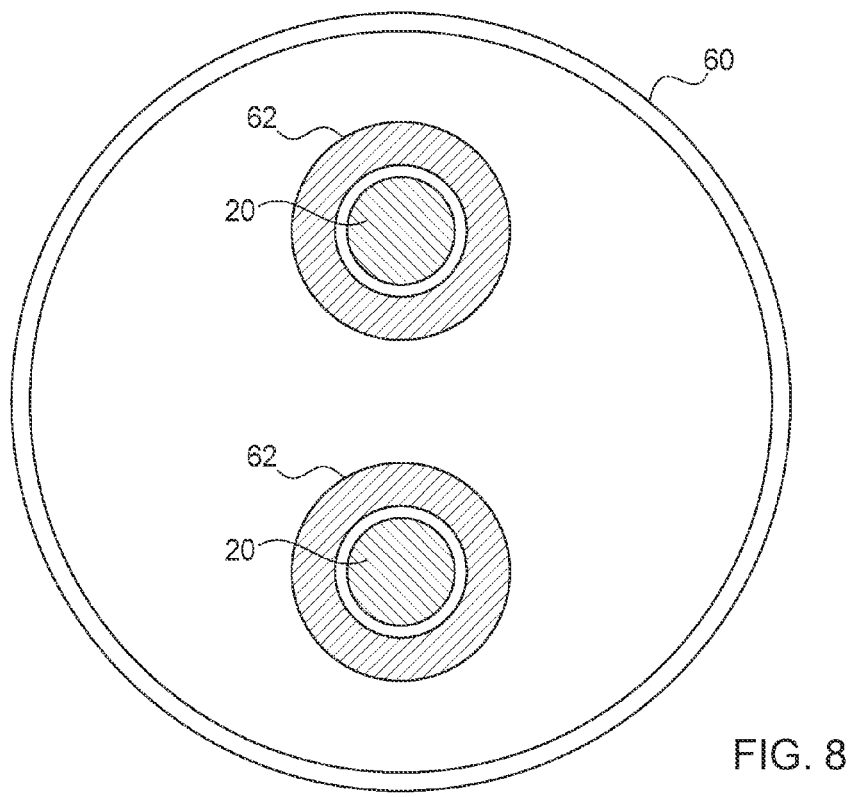
FIG. 8 is a schematic cross-sectional view, with parts removed, along line B-B[1] of FIG. 4 with a housing schematically added.

With reference to FIGS. 1, 4, 5 and 6 of the drawings, spur drive gear halves 21a, 21b, 22a and 22b each have a cylindrical flange bearing member 62 mounted on their outer face facing first end 10 of spline helical cut drive shaft 20. Spur drive gear halves 21a, 21b, 22a and 22b each also have a cylindrical flange bearing member 62 mounted on their outer face facing second end 11 of spline helical cut drive shaft 20. Spur driven gear halves 31a, 31b, 32a, 32b each have a cylindrical flange bearing member 62 mounted on their outer face facing first end 12 of spline helical cut driven shaft 30. Spur driven gear halves 31a, 31b, 32a and 32b each have a cylindrical flange bearing member 62 mounted on their outer face facing second end 13 of spline helical cut driven shaft 30. The cylindrical flange bearing members 62 move axially with respect to the spline helical cut drive shaft 20 and the spline helical cut driven shaft 30 along with their respective spur drive/driven gear half Cylindrical flange bearing members 62 are schematically illustrated in cross-section, with parts omitted, in FIG. 8 of the drawings.

The axial length of each cylindrical flange bearing member 62 would be selected based upon load bearing requirements of the gear train. However, at a minimum, the length of member 62 would be chosen to be sufficient to maintain the inner diameter helical cut spline on the respective spur drive gear halves 21a, 21b, 22a, 22b in full engagement with the respective helical cut splines 40, 41, 42, 43 on the outer diameter of spline helical cut drive shaft 20. Likewise, the axial length of each cylindrical flange bearing member 62 for the spur driven gear halves would be chosen from load bearing considerations, however, at a minimum would be chosen to maintain the inner diameter helical cut spline on the respective spur driven gear halves 31a, 31b, 32a, 32b in full engagement with the respective helical cut splines 50, 51, 52, 53 on the outer diameter of spline helical cut driven shaft 30.

It will be appreciated that one skilled in the art could provide bearing housings for supporting cylindrical flange being members 62 and for maintaining the alignment of spline helical cut drive shaft 20 and spline helical cut driven shaft 30.

With reference to the embodiment of the present invention illustrated in FIGS. 1, 4, 5 and 6, a retaining ring 57a is located near first end 10 of spline helical cut drive shaft 20 and a retaining ring 57b is located near second end 11 of spline helical cut drive shaft 20. A retaining ring 58a is located near first end 12 of spline helical cut driven shaft 30 and a retaining ring 58b is located near the second end 13 of spline helical cut driven shaft 30. The retaining rings 57a, 57b, 58a, 58b are mounted on their respective shafts so that they cannot move in the axial direction of their respective shafts. Retaining rings 57a, 57b on spline helical cut drive shaft 20 retain or stop axial movement of spur drive gear halves on the spline helical cut drive shaft 20. Retaining rings 58a, 58b on spline helical cut driven shaft 30 retain or stop axial movement of spur driven gear halves on spline helical cut driven shaft 30. The function of the retaining rings will be hereinafter more fully explained.

Spline helical cut drive shaft 20 and spline helical cut driven shaft 30 are mounted (not illustrated) so that they remain parallel to one another and so that they do not move in their respective axial directions in response to forces established by rotation of the respective shafts and rotation of respective spur drive gear halves and spur driven gear halves.

Figure 9:
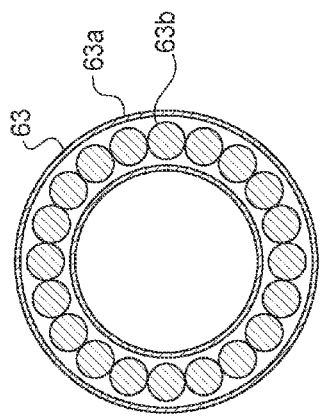
FIG. 9 is a schematic cross-sectional view along line C-C[1] of FIG. 4.

With reference to the embodiment of the present invention illustrated in FIGS. 1, 4, 5 and 6, a thrust bearing 63 is mounted on spline helical cut drive shaft 20 between spur drive gear half 21a and spur drive gear half 21b. A thrust bearing 64 is mounted on spline helical cut drive shaft 20 between spur drive gear half 22a and sput drive gear half 22b. A thrust bearing 65a is mounted on spline helical cut driven shaft part 30a between spur driven gear half 31b and spline sleeve 69. A thrust bearing 65b is mounted on spline helical cut driven shaft part 30b between spur driven half 32a and spline sleeve 69. Thrust bearings 63, 64 are mounted on spline helical cut drive shaft 20 for axial movement with respect to spline helical cut drive shaft 20. Thrust bearings 65a and 65b are mounted on spline helical cut driven shaft 30 for axial movement with respect to spline helical cut driven shaft 30. FIG. 9 schematically illustrates in cross-section, with parts removed, a ball bearing type thrust bearing 63 comprising bearing race 63A and ball bearings 63B. A thrust bearing could be a washer.

Operation of the gear transmission, in accordance with the present invention, will now be explained in conjunction with FIGS. 4, 5 and 6. FIG. 4 illustrates an embodiment of the present invention, which uses two sets of spur gears, prior to the start of rotation of spline helical cut drive shaft 20. The first set of spur gears comprises a pair of spur drive gear halves 25 engaging a pair of spur driven gear halves 35. The second set of spur gears comprises a pair of spur drive gear halves 26 engaging a pair of spur driven gear halves 36.

Rotation of spline helical cut drive shaft 20 is started in the counter-clockwise direction in the embodiment of the present invention illustrated in the drawings. Upon the start of this counter-clockwise rotation of spline helical cut drive shaft 20, due to manufacturing tolerance in the gears, one set of spur gears, say 26, 36, will engage first. The axial thrust previously explained will cause spur driven gear half 32a and spur driven gear half 32b to begin to separate in the axial direction on spline helical cut driven shaft 30. Spur drive gear half 22a and spur drive gear half 22b will begin to be pushed together in the axial direction of spline helical cut drive shaft 20. This is schematically illustrated (greatly exaggerated) in FIG. 5. This allows spline helical cut drive shaft 20 to further rotate in the counter-clockwise direction without loading or rotating the spur driven gear halves.

Due to manufacturing tolerances and continued counter-clockwise rotation of spline helical cut drive shaft 20, the second set of spur gears 25, 35 will begin to engage and spur driven gear half 31a and spur driven gear half 31b will begin to separate in the axial direction on spline helical cut driven shaft 30 due to axial thrusts. Spur drive gear half 21a and spur drive gear half 21b will begin to be pushed together in the axial direction on spline helical cut drive shaft 20.

Manufacturing tolerances will continue to permit counter-clockwise rotation of spline helical cut drive shaft 20 without loading of the spline helical cut drive shaft 20 and without rotation of spline helical cut driven shaft 30 due to the continued spreading of the pairs of spur driven gear halves until such time that retaining rings 58a, 58b on spline helical cut driven shaft 30 stop the axial spreading of the pairs of spur driven gears by abutment with force of cylindrical flange bearing member 62 on spur driven gear half 31a with retaining ring 58a and abutment with force of cylindrical flange bearing member 62 on spur driven gear half 32b with retaining ring 58b and by cylindrical flange bearing members 62 on adjacent driven spur gear half 31b and driven spur gear half 32a being in abutment with force with thrust bearings 65a, 65b on spline helical cut driven shaft 30. This is illustrated in FIG. 6.

FIG. 6 also illustrates cylindrical flange bearing members 62 of adjacent spur drive gear half 21a and spur drive gear half 21b abutting with force thrust bearing 63 on spline helical cut drive shaft 20 and likewise cylindrical flange bearing members 62 of adjacent spur drive gear half 22a and spur drive gear half 22b abutting with force thrust bearing 64 on spline helical cut drive shaft 20.

The function of thrust bearings 63 and 64 is as follows. Under loading, adjacent spur drive gear half 21a and spur drive gear 21b push towards one another with significant force. Likewise adjacent spur drive gear half 22a and spur drive gear half 22b push towards one another with significant force. For load balancing to occur the drive gear pair 21a and 21b must be able to move, as a pair, axially on drive shaft 20 to center opposite driven gear pair 31a and 31b. Since the drive gears 22a and 21b are mounted on shaft 20 via helical splines of opposite hand or sense, as the gear pair 21a and 21b move axially along shaft 20, drive gear 21a will rotate in the opposite direction as drive gear 21b. Thrust bearing 63 allows the drive gear pair 21a and 21b, which are forcefully pushing together, to rotate relative to one another. If there were no accommodation for this relative rotation, the drive gear pair 22a and 21b would act as a single gear, and would be unable to move axially along shaft 20, being locked in place by their opposite hand helical splines. Thrust bearing 64 functions similarly for drive gears 22a and 22b.

The design permits spline helical drive shaft 20 to continue to rotate in the counter-clockwise direction in the unloaded condition until all sets of spur gears engage and spreading of all pairs of spur driven gear halves starts in the axial direction of spline helical cut driven shaft 30 without loading and rotation of the spline helical cut driven shaft 30. That is, retaining rings 58a and 58b are located on spline helical cut driven shaft 30 to provide sufficient axial play or axial distance so that all pairs of spur driven gear halves of all spur gear sets have begun to separate in the axial direction of spline helical driven shaft 30 prior to cylindrical flange bearing member 62 of outermost spur driven gear half 31a being abutted with force against retaining ring 58a and cylindrical flange bearing member 62 of outermost spur driven gear half 32b being abutted with force against retaining ring 58b. With this continued rotation of drive shaft 20, driven gears 31b and 32a are pushed toward one another. Between driven gears 31b and 32a is spline sleeve 69, and bearing members 62 of gears 31b and 32a abut spline sleeve 69, as gears 31b and 32a forcibly push towards one another. Between bearing member 62 of gear 31b and spline sleeve 69 is a thrust bearing 65a. Between bearing member 62 of gear 32a and spline sleeve 69 is a thrust bearing 65b. Thrust bearings 65a and 65b allow the relative rotation between gears 31b and 32a to allow axial movement of the gears 31b and 32a necessary for load sharing. Spline sleeve 69 provides the compressional connection between driven gears 31b and 32a. At the time retaining rings 58a and 58b prevent any further total axial spreading of the pairs of spur driven gear pairs, loading of the spline helical cut drive shaft 20 and rotation of spline helical cut driven shaft 30 begin. The distance of the axial spreading between gear halves of the pairs of spur driven gear halves can still change relative to one another to balance load which will hereinafter be discussed.

FIG. 6 illustrates the spreading of all pairs of spur driven gear halves in the axial direction of spline helical cut driven shaft 30 with axial spreading being stopped by retaining rings 58a and 58b.

The unloaded counter-clockwise rotation of spline helical drive shaft 20 continues until all the play or axial movement of spur driven gear halves of the pairs of spur driven gear halves permitted by the positioning of the retaining rings 58a, 58b on spline helical driven shaft 30 is taken up. When the spur driven gear halves on the driven shaft 30 are bearing with force against one another and against the retaining rings, all spur driven gear halves are engaged, mated and loaded as hereinafter discussed and rotation of the spline helical cut driven shaft begins.

Since the thrust causing axial spreading of the pairs of spur driven gear halves is directly proportional to the load carried by each pair, any imbalance in load results in a thrust imbalance between the pairs of spur drive gear halves. That is, the pair of spur driven gear halves which is experiencing the heavier load will start to spread further. Since the retaining rings will not allow any additional total axial spreading of the pairs of spur driven gear halves on the spline helical cut driven shaft, the spreading of the heavier loaded pair of spline driven gear halves cause other pairs of spur driven gear halves on the spline helical cut driven shaft to be pushed toward one another reducing their axial separation, which increases their load share and thereby rebalances the load. Since all the gear halves of pairs of spur driven gear halves on the spline helical cut driven shaft are allowed to move freely and interact with one another, there is a net thrust from only the spur drive gear half at each end of the spline helical cut driven shaft. The thrust of the other spur driven gear halves is balanced by the opposite thrust of adjacent spur driven gear halves.

Just as the spur driven gear halves must be free to move axially on the spline helical cut driven shaft, the spur drive gear halves must be free to move axially on the spline helical cut drive shaft.

As previously discussed, the counter-clockwise rotation of spline helical cut drive shaft 20 in the illustrated embodiment results in pairs of spur drive gears 21*a*, 21*b* and 22*a*, 22*b* to be pushed tightly together in the axial direction of spline helical cut drive shaft 20. However, the pairs of spur drive gears pushed tightly together must be free to move axially on the spline helical cut drive shaft 20. Due to differences in manufacturing tolerances, the pairs of spur driven gears on the spline helical cut driven shaft do not spread equally in the axial direction of the spline helical cut driven shaft. This uneven spreading of the pairs of spur driven gears results in an unbalanced load on one side or the other of the pairs of spur drive gears which causes the pairs of spur drive gears pushed tightly together to move axially along the spline helical cut drive shaft to "center" themselves with respect to respective pairs of spur driven gears to achieve balanced load.

The foregoing described interaction between the pairs of spur drive gears on the spline helical cut drive shaft and the pairs of spur driven gears on the spline helical cut driven shaft results in automatic balancing of load between all engaging and mating pairs of spur drive gears and spur driven gears.

In the embodiment described, retaining rings 58*a*, 58*b* fixed on spline helical cut driven shaft 30 must permit for sufficient play or axial movement of the pairs of spur driven gear halves on spline helical cut driven shaft 30 so that all pairs of spur driven gear halves mounted on spline helical cut driven shaft 30 spread prior to retaining rings 58*a*, 58*b* prevent additional total axial spreading of the pairs of spur driven gears on spline helical cut driven shaft 30 and thus load being transmitted from spline helical cut drive shaft 20 to spline helical cut driven shaft 30.

This distance of the axial spreading of the pairs of spur driven gear halves illustrated in FIGS. 5 and 6 is greatly exaggerated for purposes of description of the present invention. In actual practice, the axial spreading of the pairs of spur driven gears on the spline helical cut driven shaft of the illustrated embodiment will be on the order of a few thousandths of an inch or on the order of a thousandth of a millimeter.

It will be understood that the embodiment of the present invention described in conjunction with FIGS. 4, 5 and 6 is only by way of illustrative example to explain the principles of the present invention. Many other embodiments will become readily apparent to one skilled in the art. As previously discussed, the embodiment of the present invention illustrated in FIGS. 4, 5 and 6 uses two sets of pairs of spur drive gears and pairs of spur driven gears. The number of sets of pairs of spur drive gears and pairs of spur driven gears would be dependent on upon the design criteria for a specific application. The diameters of the spur drive gears and spur driven gears on the spline helical cut drive shaft and spline helical cut driven shaft may be selected to provide either a step up or step down gear transmission. The spline helical cut drive shaft 20 in the embodiment of FIGS. 4, 5 and 6 may be rotated in the clockwise direction. This would cause the pairs of spur drive gear halves on spline helical cut drive shaft 20 to separate and the pairs of spur driven gear halves of spline helical cut driven shaft 30 to be pushed together. The principles of operation of the present invention would be the same as previously described. The sense or hand of the helical cut on the spline helical cut on the spline helical cut drive shaft and the spline helical cut driven shaft could be reversed with the sense or hand of the helical cut on the inner diameter of respective spur drive gear halves and spur driven gear halves reversed. As will be apparent to one skilled in the art, this will not change the principles of operation of the present invention.

Figure 10A:
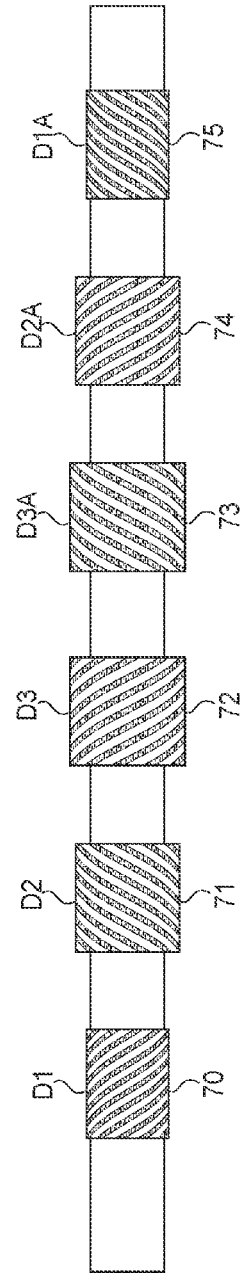
FIG. 10A is a schematic view of another embodiment of a spline helical cut drive shaft in accordance with the present invention.
Figure 10B:
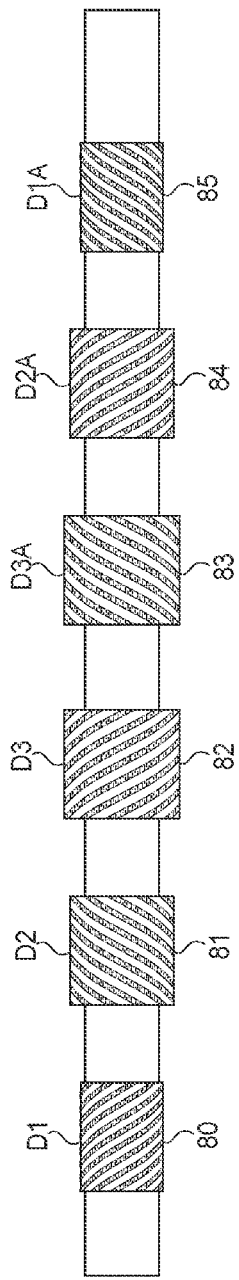
FIG. 10B is a schematic view of another embodiment of a spline helical cut driven shaft in accordance with the present invention.

The preferred embodiment of the present invention is shown in FIGS. 1 thru 6, wherein the drive shaft 20 and driven shaft 30 comprises of multiple, shorter shafts joined by spline sleeves for the purpose of assembly. FIG. 10A illustrates an alternative embodiment of the present invention not requiring splitting the drive and the driven shafts for assembly purposes. FIG. 10A shows a one piece spline helical cut drive shaft 20 which has six spline helical cuts 70, 71, 72, 73, 74, 75 on the outer diameter of spline helical cut drive shaft 20. In the embodiment of FIG. 10A, three pairs of spur drive gear halves would be used. FIG. 10B illustrates the alternative embodiment of the present invention of FIG. 10A wherein spline helical cut driven shaft 30 has six spline helical cuts 80, 81, 82, 83, 84, 85 on the outer diameter of spline helical cut driven shaft 30. Thus, in the embodiment of FIG. 10B, three pairs of spur driven gear halves would be used. The embodiment of the present invention of FIGS. 10A, 10B would employ three sets of spur gears.

FIGS. 10A, 10B illustrate an embodiment of the present invention which also facilitates ease of assembly of the gear transmission of the present invention when more than one set of spur gears is used. With reference to FIG. 10A, inner spline helical cuts 72, 73 have an outer diameter D3 and D3A respectively, wherein D3 equals D3A. Intermediate spline helical cuts 71, 74 have an outer diameter D2 and D2A respectively, wherein D2 equals D2A. Outer spline helical cuts 70, 75 have an outer diameter D1 and D1A respectively, wherein D1 equals D1A. Outer diameter D3, D3A of spline helical cuts 72, 73 is greater than outer diameter D2, D2A of spline helical cuts 71, 74. Outer diameter D2, D2A of spline helical cuts 71, 74 is greater than outer diameter D1, D1A of spline helical cuts 70, 75. It will be appreciated that the inner diameter of the spur drive gear halves with the helical cut engaging spline helical cuts 72, 73 will be greater than the inner diameter of the spur drive gear halves with the helical cut engaging spline helical cuts 71, 74. The inner diameter of the spur drive gear halves with the helical cut engaging spline helical cuts 71, 74 will likewise be greater than the inner diameter of the spur drive gear halves with the helical cut engaging spline helical cuts 70, 75. This arrangement will facilitate the assembly of the spur drive gear halves on spline helical cut drive shaft 20.

The same arrangement described with respect to the spline helical cut drive shaft 20 of FIG. 10A would apply to spline helical cut driven shaft 30 illustrated in FIG. 10B. This arrangement will facilitate the assembly of the spur driven gear halves on spline helical cut driven shaft 30.

The arrangement described with respect to FIGS. 10A, 10B, can be employed in a gear transmission in accordance with the present invention which uses two sets, three sets (FIGS. 10A, 10B) or a plurality of sets of spur gears in the gear transmission of the present invention.

With reference to the embodiment of the present invention illustrated in FIGS. 10A, 10B, the outer diameter of all spur drive gear halves mounted on the spline helical drive shaft would be equal to one another. The outer diameter of all spur driven gear halves mounted on the spline helical cut driven shaft would be equal to one another. The difference between the outer diameter of the spur drive gear halves and the outer diameter of the spur driven gear halves would depend on whether the gear transmission was a step up or step down gear transmission.

With reference to the embodiment of the present invention illustrated in FIGS. 10A, 10B, in order to provide for equal axial force or thrust between adjacent spur drive gear halves and spur driven gear halves having differing inner diameters with a helical cut mounted on a spline helical cut drive/driven shaft having differing outer diameters for adjacent helical cut splines, the helical angles of the two differing helical cut splines are such that the ratio of the spline pitch diameter to the tangent of the helical angle of the spline helical cut is of equal magnitude, but opposite in sign. With this arrangement of helical cut splines in the embodiment of FIGS. 10A, 10B, when two adjacent spur drive gear halves or spur driven gear halves are equally loaded torsionally, their axial force or thrust will be equal but opposite in direction.

In an alternative embodiment of the present invention, if there is only one set of spur gears, i.e., one pair of spur drive gears and one pair of spur driven gears, each spur driven gear half can be mounted on the driven shaft at a spaced apart fixed location. The spur driven gear halves could be, e.g., welded on the driven shaft at a spaced apart location opposite to the spur drive gear halves. In this embodiment of the present invention, the driven shaft would not have to be a spline helical cut driven shaft. The spur drive gear halves of the one pair of spur drive gears would be mounted on a spline helical cut drive shaft for axial movement on the spline helical cut drive shaft toward one another and operate as previously described to achieve balanced load transmission. It will be apparent that if rotation of the spline helical cut drive shaft and spline helical cut driven shaft were reversed, the one pair of spur drive gears could be mounted on the drive shaft at a spaced apart fixed location and the one pair of spur driven gears could be mounted on a spline helical cut driven shaft for axial movement toward one another.

Figure 11:
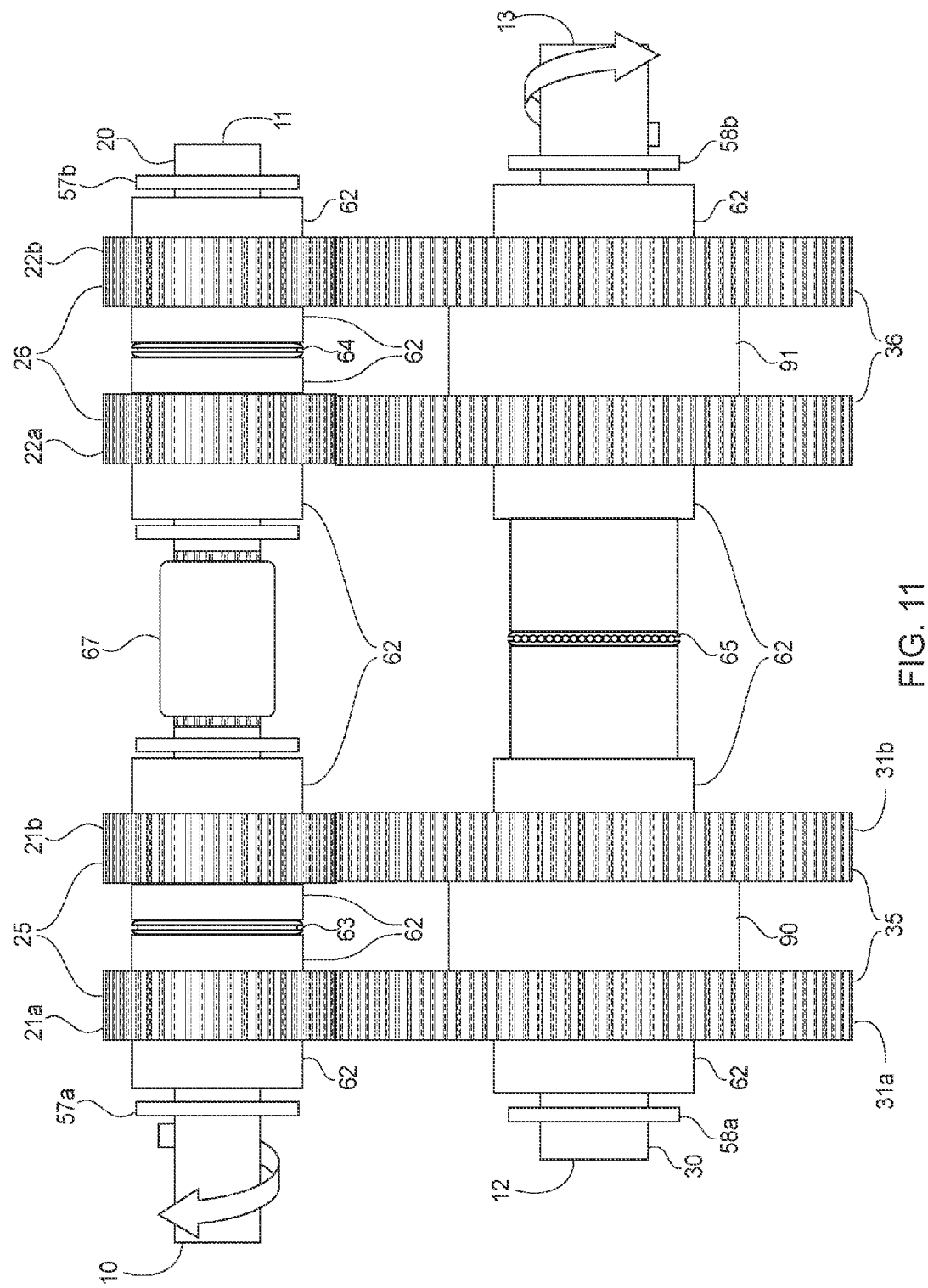
FIG. 11 is a schematic view of an alternative embodiment of the gear transmission of the present invention for use with only two pairs of spur drive gears and two pairs of spur driven gears at the time of equal loading among all the spur drive gears and all the spur driven gears.

FIG. 11 schematically illustrates an alternative embodiment of the gear transmission of the present invention for use with only two pair of spur drive gears and only two pair of spur driven gears. FIG. 11 schematically illustrates a point in time when there is equal or balanced loading among all the spur drive gears and all the spur driven gears wherein there is counter-clockwise rotation of spline helical cut drive shaft 20 and clockwise rotation of spline helical cut driven shaft 30.

As previously discussed with respect to the embodiment of FIGS. 4 to 6, in FIG. 11, a first pair 25 of spur drive gears comprising first spur drive gear half 21*a* and second spur drive gear half 21*b* and a second pair 26 of spur drive gears comprising first drive gear half 22*a* and second drive gear half 22*b* are mounted on spline helical cut drive shaft 20 for rotation by drive shaft 20.

Figure 12:
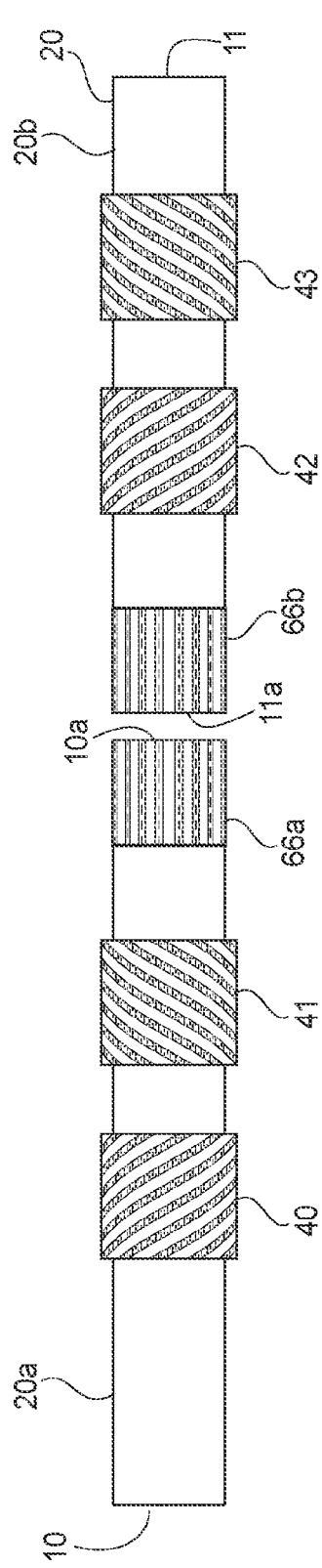
FIG. 12 is a schematic view of an embodiment of a spline helical cut drive shaft in accordance with the present invention for use in the embodiment of the gear transmission of the present invention illustrated in FIG. 11.

FIG. 12 schematically illustrates a preferred embodiment of a spline helical cut drive shaft 20 for use as an embodiment of a spline helical cut drive shaft 20 of the gear transmission of the present invention schematically illustrated in FIG. 11. The embodiment of the spline helical cut drive shaft 20 of FIG. 12 comprises spline helical cut drive shaft parts 20*a* and 20*b* joined torsionally by spline sleeve 67 to provide spline helical cut drive shaft 20 as previously discussed in detail with respect to the embodiment of the present invention schematically illustrated in FIG. 2 and FIGS. 4 to 6. As in FIG. 2, the spline helical cut drive shaft 20 of the preferred embodiment schematically illustrated in FIG. 12 is provided with spline helical cuts 40, 41, 42, 43 on the outer diameter of spline helical cut drive shaft 20.

Upon counter-clockwise rotation of spline helical drive shaft 20 of the embodiment of FIG. 11, operation of spline helical cut drive shaft 20, first pair 25 of spur drive gears and second pair 26 of spur drive gears would be the same as previously described in detail in conjunction with the embodiment of the gear train of the present invention schematically illustrated in FIGS. 4 to 6.

Mounted on spline helical cut driven shaft 30 for rotating the driven shaft are a first pair 35 of spur driven gears and a second pair 36 of spur driven gears. First pair 35 of spur driven gears comprises spur driven gear half 31*a* and spur driven gear half 31*b*. The inner diameter of spur driven gear half 31*a* and spur driven gear half 31*b* have a helical cut spline at the same angle and the same sense or hand. Second pair 36 of spur driven gears comprises spur drive gear half 32*a* and spur driven gear half 32*b*. The inner diameter of spur driven gear half 31*a* and spur driven gear half 31*b* have a helical cut spline at the same angle and the same sense or hand. The angle and the sense or hand of the helical cut spline on the inner diameter of spur driven gear halves 31*a*, 31*b* is the same angle as, but opposite in sense or hand with respect to the helical cut spline on the inner diameter of spur driven gear halves 32*a*, 32*b*.

In one embodiment of the present invention schematically illustrated in FIG. 11, first pair 35 of spur driven gear halves 31*a*, 31*b* would be connected by a cylindrical sleeve 90. By way of example, spur driven gear halves 31*a*, 31*b* and cylindrical sleeve 90 could be machined together. Thus, first pair 35 of spur driven gear halves 31*a*, 31*b* schematically illustrated in the embodiment of the present invention of FIG. 11 would be a one-piece pair 35 of spur driven gears comprising spur driven gear halves 31*a*, 31*b*. Cylindrical sleeve 90 would maintain spur drive gear halves 31*a*, 31*b* on spline helical cut driven shaft 30 at a fixed spaced apart axial location with respect to one another.

In one embodiment, cylindrical sleeve 90 would have a helical cut spline on an inner diameter having the same angle and the same sense or hand as the helical cut spline on the inner diameter of spur driven gear halves 31*a*, 31*b*. In one-piece spur driven gear pair 35 comprising spur driven gear halves 31*a*, 31*b* and cylindrical sleeve 90 of FIG. 11, there is preferably a single helical cut spline on the inner diameter of spur driven gear halves 31*a*, 31*b* and the inner diameter of cylindrical sleeve 90, wherein this single helical cut spline is machined when one-piece pair 35 of spur driven gears is machined.

Similarly, in the embodiment of FIG. 11, there is a one-piece pair 36 of spur driven gears comprising spur driven gear halves 32*a*, 32*b* and cylindrical sleeve 91 having a single helical cut spline machined on the inner diameter of spur driven gear halves 32*a*, 32*b* and the inner diameter of cylindrical sleeve 91. As will be appreciated, the angle of the single helical cut spline on the inner diameter of one-piece spur driven gear pair 36 will be the same as the angle of the single helical cut on the inner diameter of one-piece spur driven gear pair 35, but of the opposite sense or hand.

Figure 13:
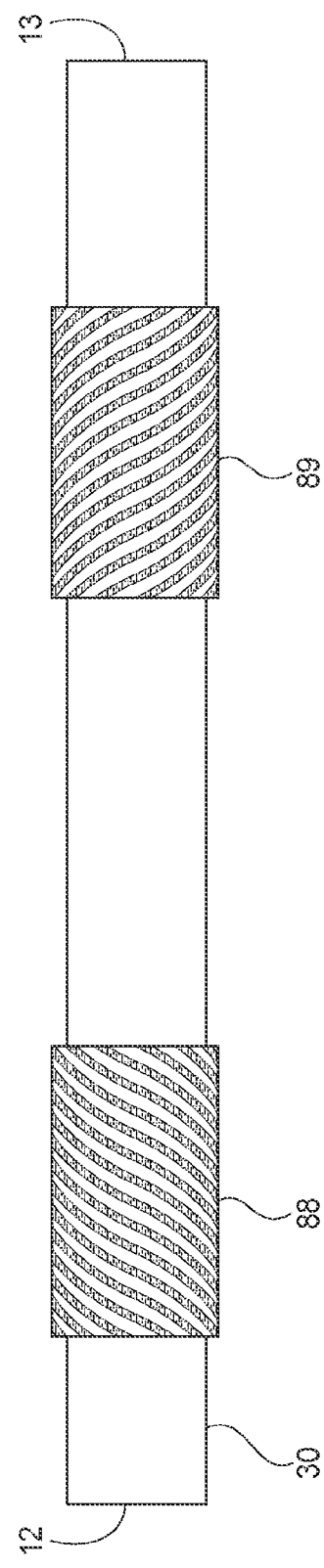
FIG. 13 is a schematic view of an embodiment of a spline helical cut driven shaft in accordance with the present invention for use in the embodiment of the gear transmission of the present invention illustrated in FIG. 11.

FIG. 13 schematically illustrates a one piece spline helical cut driven shaft 30 for use in the embodiment of the present invention of FIG. 11. Spline helical cut driven shaft 30 is provided with a single first helical cut spline 88 on the outer diameter and a single second spline helical cut 89 on the outer diameter.

First helical cut spline 88 on the outer diameter of driven shaft 30 has the same angle and sense or hand as the single helical cut spline on the inner diameter of one-piece pair 35 of spur driven gears. The helical cut spline on the inner diameter of one-piece pair 35 of spur driven gears engages first helical cut spline 88 on the outer diameter of driven shaft 30. It will be appreciated, that upon rotation of spline helical cut driven shaft 30, axial thrust forces will be established causing one-piece pair 35 of spur driven gear halves 31*a*, 31*b* to move axially as a unit on spline helical cut driven shaft 30.

Second helical cut spline 89 provided on the outer diameter of driven shaft 30 is a single helical cut spline that has the same angle and sense or hand as the single helical cut spline on the inner diameter of one-piece pair 36 of spur driven gears. The spline helical cut on the inner diameter of one-piece pair 36 of spur driven gears engages second helical cut spline 89 on the outer diameter of driven shaft 30. It will be appreciated, that upon rotation of spline helical cut driven shaft 30, axial thrust forces will be established causing one-piece pair 36 of spur driven gear halves 32*a*, 32*b* to move axially as a unit on spline helical cut driven shaft 30.

The outer diameter of single first helical cut spline 88 on driven shaft 30 is the same as the outer diameter of single second helical cut spline 89 on driven shaft 30.

First pair 25 of spur drive halves 21*a*, 21*b* engage first one-piece pair 35 of spur driven gear halves 31*a*, 31*b*. Second pair 26 of spur drive gear halves 22*a*, 22*b* engage second one-piece pair 36 of spur driven gear halves 32*a*, 32*b*.

As previously discussed in detail in conjunction with FIGS. 3 to 6, counter-clockwise rotation of spline helical cut drive shaft 20 results in spur drive gear half 21*a* and spur drive gear half 21*b* to move toward each other on spline helical cut drive shaft 20 and push tightly together against thrust bearing 63. Similarly, spur drive gear halves 22*a*, 22*b* move toward each other on spline helical cut drive shaft 20 and push tightly together against thrust bearing 64. Likewise, spur drive gear halves 21*a*, 22*b* move together in the axial direction on spline helical cut drive shaft 20 and spur drive gear halves 22*a*, 22*b* move together in the axial direction on spline helical cut drive shaft 20.

The counter-clockwise rotation of spline helical cut drive shaft 20 and thus spur drive gear halves 21*a*, 21*b* and spur drive gear halves 22*a*, 22*b* cause clockwise rotation of spur driven gear halves 31*a*, 32*b* and spur driven gear halves 32*a*, 32*b* and therefore clockwise rotation of spline helical cut driven shaft 30.

The spline helical cuts are such that clockwise rotation of spline helical cut driven shaft 30 cause first one-piece pair 35 of spur driven gears and second one-piece pair 36 of spur driven gears to move axially as units towards one another on spline helical cut driven shaft 30 and push tightly together against thrust bearing 65.

As discussed in conjunction with FIGS. 4 to 6, the first pair 25 of spur drive gear halves balances with the first one-piece pair 35 of spur driven gear halves and the second pair 26 of spur drive gear halves balances with the second one-piece pair 36 of spur driven gear halves. If first one-piece pair 35 of spur driven gear halves is more heavily loaded than second one-piece pair of 36 of spur driven gears, first one-piece pair 35 of spur driven gears pushes as a unit to the right pushing second one-piece pair 36 of spur driven gears as a unit to the right to achieve balanced load. If second pair 36 of spur driven gears is more heavily loaded, the opposite occurs. Balance load is obtained between all spur drive gear halves and spur driven gear halves for the only two pair of spur drive gears and only two pair of spur driven gears. FIG. 11 schematically illustrates the condition of balanced load sharing.

It will be appreciated that the spline helical cut drive shaft could be rotated in the clockwise direction with the sense or hand of helical cut splines reversed and the described principle of operation would be the same. Likewise, it will be appreciated that the two pair of spur drive gears could each be mounted on the spline helical cut drive shaft as one-piece pairs and the two pair spur driven gears could each be mounted on the spline helical cut driven shaft as previously described in conjunction with FIGS. 4 to 6. The described principal of operation would be the same.

In the embodiment of the gear transmission of the present invention schematically illustrated in FIG. 11 for only two pair of spur drive gears and only two pairs of spur driven gears, the outer diameter of the spur drive gears on spline helical cut drive shaft 20 is smaller than the outer diameter of the spur driven gears on spline helical cut driven shaft 30. Thus, in the embodiment of the present invention schematically illustrated in FIG. 11, the gear transmission of the present invention is a step down gear transmission. It will be appreciated that in the embodiment of the present invention illustrated in FIG. 11, the outer diameter of the spur drive gears on the spline helical cut drive shaft 20 could be larger than the outer diameter of the spur driven gears on the spline helical cut driven shaft 30, with this embodiment of the present invention (not illustrated) being a step up gear transmission.

The present invention provides for a commercially practical cost-effective gear transmission having multiple spur drive gears mounted on a common spline helical cut drive shaft and multiple spur driven gears mounted on a common spline helical cut driven shaft. The spur gears and the spline helical cut drive shaft and spline helical cut driven shaft used in the present invention need only have commercially practical, cost-effective manufacturing tolerances.

Although preferred embodiments of the present invention have been described in detail, it is apparent that modifications may be made by those skilled in the art within the spirit and scope of the present invention defined in the claims.

What is claimed is:

1. A gear transmission comprising:
   a spline helical cut drive shaft having a first end, a second end and an axis;
   a driven shaft disposed parallel to said spline helical cut drive shaft, said driven shaft having a first end, a second end and an axis, wherein the axis of said driven shaft is parallel to the axis of said spline helical cut drive shaft;
   at least one set of spur gears, said set of spur gears comprising: a pair of spur drive gears mounted on said spline helical cut drive shaft for rotation by and, when necessary, axial movement on said spline helical cut drive shaft;
   a pair of spur driven gears mounted on said driven shaft for rotating said driven shaft;
   said pair of spur drive gears comprising a first spur drive gear half and a second spur drive gear half;
   said pair of spur driven gears comprising a first spur driven gear half and a second spur driven gear half;
   said first spur drive gear half engaging said first spur driven gear half for rotating said first spur driven gear half and said second spur drive gear half engaging said second spur driven gear half for rotating said second spur driven gear half;
   said first spur drive gear half being a first cylindrical member having a first helical cut spline provided on an inner diameter of said first spur drive gear half cylindrical member, with said inner diameter first helical cut spline of said first spur drive gear half cylindrical member engaging an outer diameter of said spline helical cut drive shaft for rotation of said first spur drive gear half by rotation of said spline helical cut drive shaft and for permitting axial movement of said first spur drive gear half on said spline helical cut drive shaft;
   said second spur drive gear half being a second cylindrical member having a second helical cut spline provided on an inner diameter of said second spur drive gear half cylindrical member, with said inner diameter second helical cut spline of said second spur drive gear half cylindrical member engaging a second helical cut spline provided on an outer diameter of said spline helical cut drive shaft for rotation of said second spur drive gear half by rotation of said spline helical cut drive shaft and for permitting axial movement of said second spur drive gear half on said spline helical cut drive shaft;

wherein said helical cut splines are selected whereby said first spur drive gear half and said second spur drive gear half of said set move axially on said spline helical cut drive shaft toward one another on said spline helical cut drive shaft in response to rotation of said spline helical cut drive shaft.

2. A gear transmission according to claim 1 further comprising: a thrust bearing mounted on said spline helical cut drive shaft for axial movement on said spline helical cut drive shaft, said thrust bearing located on said spline helical cut drive shaft between said first spur drive gear half and said second spur drive gear half of said set.

3. A gear transmission according to claim 1 further comprising:

said first spur driven gear half being a first cylindrical member having a first helical cut spline provided on an inner diameter of said first spur driven gear half cylindrical member, with said inner diameter first helical cut spline of said first spur driven gear half cylindrical member engaging a first helical cut spline provided on an outer diameter of said driven shaft for rotation of said driven shaft by rotation of said first spur driven gear half and for permitting axial movement of said first spur driven gear half on said driven shaft;

said second spur driven gear half being a second cylindrical member having a second helical cut spline provided on an inner diameter of said second spur driven gear half cylindrical member, with said inner diameter second helical cut spline of said second spur driven gear half cylindrical member engaging a second helical cut spline provided on an outer diameter of said driven shaft for rotation of said driven shaft by rotation of said second spur driven gear half and for permitting axial movement of said second spur driven gear half on said driven shaft;

wherein said helical cut splines are selected whereby said first spur driven gear half and said second spur driven gear half of said set move axially away from one another on said driven shaft in response to rotation of said driven shaft.

4. A gear transmission according to claim 3 further comprising:

a first retainer member located at a fixed axial location on said driven shaft adjacent said first end of said driven shaft and a second retainer member located at a fixed axial location on said driven shaft adjacent said second end of said driven shaft, with said spur driven gear halves located on said driven shaft between said first and second retainer members of said driven shaft;

said driven shaft first and second retainer members being spaced from one another at a distance in the axial direction of said driven shaft to permit axial movement of said spur driven gear halves of said set away from one another on said driven shaft in the axial direction of said driven shaft and to prevent said spur driven gear halves of said set from disengaging respective spur drive gear halves of said set.

5. A gear transmission according to claim 1 further comprising:

one set of spur gears, said one set of spur gears comprising: one pair of spur drive gears;

one pair of spur driven gears; wherein said first spur driven gear half and said second spur driven gear half of said one pair of spur gears are both mounted on said driven shaft at a fixed axial spaced apart location.

6. A gear transmission comprising:

a drive shaft having a first end, a second end and an axis;

a spline helical cut driven shaft disposed parallel to said drive shaft, said spline helical cut driven shaft having a first end, a second end and an axis, wherein the axis of said spline helical cut driven shaft is parallel to the axis of said drive shaft;

at least one set of spur gears, said set of spur gears comprising: a pair of spur drive gears mounted on said drive shaft for rotation by said drive shaft;

a pair of spur driven gears mounted on said spline helical cut driven shaft for rotation by and, when necessary, axial movement on said spline helical cut driven shaft;

said pair of spur drive gears comprising a first spur drive gear half and a second spur drive gear half;

said pair of spur driven gears comprising a first spur driven gear half and a second spur driven gear half;

said first spur drive gear half engaging said first spur driven gear half for rotating said first spur driven gear half and said second spur drive gear half engaging said second spur driven gear half for rotating said second spur driven gear half;

said first spur driven gear half being a first cylinder member having a first helical cut spline provided on an inner diameter of said first spur driven gear half cylindrical member, with said inner diameter first helical cut spline of said first spur driven gear half cylindrical member engaging a first helical cut spline provided on an outer diameter of said drive shaft for rotation of said spline helical cut driven shaft by rotation of said first spur driven gear half and for permitting axial movement of said first spur driven gear half on said spline helical cut driven shaft;

said second spur driven gear half being a second cylindrical member having a second helical cut spline provided on an inner diameter of said second spur driven gear half cylindrical member, with said inner diameter second helical cut spline of said second spur driven gear half cylindrical member engaging a second helical cut spline provided on an outer diameter of said spline helical cut driven shaft for rotation of said spline helical cut driven shaft by rotation of said second spur driven gear half and for permitting axial movement of said second spur driven gear half on said spline helical cut driven shaft;

wherein said helical cut splines are selected whereby said first spur driven gear half and said second spur driven gear half of said set move axially on said spline helical cut driven shaft toward one another on said spline helical cut driven shaft in response to rotation of said spline helical cut driven shaft.

7. A gear transmission according to claim 6 further comprising: a thrust bearing mounted on said spline helical cut driven shaft for axial movement on said spline helical cut driven shaft, said thrust bearing located on said spline helical cut driven shaft between said first spur driven gear half and said second spur driven gear half of said pair.

8. A gear transmission according to claim 6 further comprising: said first spur drive gear half being a first cylindrical member having a first helical cut spline provided on an inner diameter of said first spur drive gear half cylindrical member, with said inner diameter first helical cut spline of said first spur drive gear half cylindrical member engaging a first helical cut spline provided on an outer diameter of said drive shaft for rotation of said first spur drive gear half by rotation of said drive shaft and for permitting axial movement of said first spur drive gear half on said drive shaft;

said second spur drive gear half being a second cylindrical member having a second helical cut spline provided on an inner diameter of said second spur drive gear half cylindrical member, with said inner diameter second helical cut spline of said second spur drive gear half cylindrical member engaging a second helical cut spline provided on an outer diameter of said drive shaft for rotation of said second spur drive gear half by rotation of said drive shaft and for permitting axial movement of said second spur drive gear half on said drive shaft;

wherein said helical cut splines are selected whereby said first spur drive gear half and said second spur drive gear half of said set move axially away from one another on said drive shaft in response to rotation of said drive shaft.

9. A gear transmission according to claim 8 further comprising:

a first retainer member located at a fixed axial location on said drive shaft adjacent said first end of said drive shaft and a second retainer member located at a fixed axial location on said drive shaft adjacent said second end of said drive shaft with said drive spur gear halves located on said drive shaft between said first and second retainer members of said drive shaft;

said drive shaft first and second retainer members being spaced from one another at a distance in the axial direction of said drive shaft to permit axial movement of said spur drive gear halves of said set away from one another on said drive shaft in the axial direction of said drive shaft and to prevent said spur drive gear halves of said set from disengaging respective spur driven gear halves of said set.

10. A gear transmission according to claim 6 further comprising:

one set of spur gears, said one set of spur gears comprising:
one pair of spur drive gears;
one pair of spur driven gears;
wherein said first spur drive gear half and said second spur drive gear half of said one pair of spur gears are both mounted on said drive shaft at a fixed axial spaced apart location.

11. A gear transmission comprising:

a spline helical cut drive shaft having a first end, a second end and an axis;

a driven shaft disposed parallel to said spline helical cut drive shaft, said driven shaft having a first end, a second end and an axis, wherein the axis of said driven shaft is parallel to the axis of said spline helical cut drive shaft;

at least two sets of spur gears, each set of spur gears comprising:

a pair of spur drive gears mounted on said spline helical cut drive shaft for rotation by and, when necessary, axial movement on said spline helical cut drive shaft;

a pair of spur driven gears mounted on said driven shaft for rotating said driven shaft;

said pair of spur drive gears of each set comprising a first spur drive gear half and a second spur drive gear half;

said pair of spur driven gears of each set comprising a first spur driven gear half and a second spur driven gear half;

said first spur drive gear half of each set engaging said first spur driven gear half of each set for rotating said first spur driven gear half of each set and said second spur drive gear half of each set engaging said second spur driven gear half of each set for rotating said second spur driven gear half of each set;

said first spur drive gear half of each set being a first cylindrical member having a first helical cut spline provided on an inner diameter of said first spur drive gear half cylindrical member, with said inner diameter first helical cut spline of said first spur drive gear half cylindrical member engaging a first helical cut spline provided on an outer diameter of said spline helical cut drive shaft for rotation of said first spur drive gear half by rotation of said spline helical cut drive shaft and for permitting axial movement of said first spur drive gear half on said spline helical cut drive shaft;

said second spur drive gear half of each set being a second cylindrical member having a second helical cut spline provided on an inner diameter of said second spur drive gear half cylindrical member, with said inner diameter second helical cut spline of said second spur drive gear half cylindrical member engaging a second helical cut spline provided on an outer diameter of said spline helical cut drive shaft for rotation of said second spur drive gear half by rotation of said spline helical cut drive shaft and for permitting axial movement of said second spur drive gear half on said spline helical cut drive shaft;

wherein said helical cut splines are selected whereby said first spur drive gear half of each set and said second spur drive gear half of each set move axially on said spline helical cut drive shaft toward one another on said spline helical cut drive shaft in response to rotation of said spline helical cut drive shaft.

12. A gear transmission according to claim 11 further comprising: a thrust bearing mounted on said spline helical cut drive shaft for axial movement on said spline helical cut drive shaft, said thrust bearing located on said spline helical cut drive shaft between said first spur drive gear half and said second spur drive gear half of each set.

13. A gear transmission according to claim 11 further comprising:

two sets of spur gears comprising a first set of spur gears and a second set of spur gears; said pair of spur driven gear halves of said first set of spur gears mounted as a unit on said driven shaft at a fixed spaced apart axial location with respect to one another and further mounted on a first helical cut spline provided on an outer diameter of said driven shaft for axial movement together as a pair on said driven shaft; said pair of spur driven gear halves of said second set of spur gears mounted as a unit on said driven shaft at a fixed spaced apart axial location with respect to one another and further mounted on a second helical cut spline provided on said outer diameter of said driven shaft for axial movement together as a pair on said driven shaft; wherein said first helical cut spline and said second helical cut spline on said outer diameter of said driven shaft are selected whereby said pair of spur driven gear halves of said first set of spur gears and said pair of spur driven gear halves of said second set of spur gears move axially on said driven shaft toward one another in response to rotation of said driven shaft.

14. A gear transmission according to claim 11 further comprising:

said first spur driven gear half of each set being a first cylindrical member having a first helical cut spline provided on an inner diameter of said first spur driven gear half cylindrical member, with said inner diameter first helical cut spline of said first spur driven gear half cylindrical member engaging a first helical cut spline provided on an outer diameter of said driven shaft for rotation of said driven shaft by rotation of said first spur driven gear half and for permitting axial movement of said first spur driven gear half on said driven shaft;

said second spur driven gear half of each set being a second cylindrical member having a second helical cut spline provided on an inner diameter of said second spur driven gear half cylindrical member, with said inner diameter second helical cut spline of said second spur driven gear half cylindrical member engaging a second helical cut spline provided on an outer diameter of said driven shaft for rotation of said driven shaft by rotation of said second spur driven gear half and for permitting axial movement of said second spur driven gear half on said driven shaft;

wherein said helical cut splines are selected whereby said first spur driven gear half of each set and said second spur driven gear of each set move axially away from one another on said driven shaft in response to rotation of said driven shaft.

15. A gear transmission according to claim 14 further comprising:

a first retainer member located at a fixed axial location on said driven shaft adjacent said first end of said driven shaft and a second retainer member located at a fixed axial location on said driven shaft adjacent said second end of said driven shaft, with said spur driven gear halves of each set located on said driven shaft between said first and second retainer members of said driven shaft;

said driven shaft first and second retainer members being spaced from one another at a distance in the axial direction of said driven shaft to permit axial movement of said spur driven gear halves of each set away from one another on said driven shaft in the axial direction of said driven shaft and to prevent said spur driven gear halves of each set from disengaging respective drive spur gear halves.

16. A gear transmission according to claim 15 further comprising:

two sets of spur gears comprising: a first set of spur gears comprising a first pair of spur drive gear halves and a first pair of spur driven gear halves;

a second set of spur gears comprising a second pair of spur drive gear halves and a second pair of spur driven gear halves;

the first spur driven gear half of said first pair of spur driven gear halves mounted on said driven shaft adjacent to said first retainer member located at the fixed axial location on said driven shaft;

the second spur driven gear half of said second pair of spur driven gear halves mounted on said driven shaft adjacent to said second retainer member located at the fixed axial location on said driven shaft;

the second spur driven gear half of said first pair of spur driven gear halves mounted on said driven shaft adjacent the first spur driven gear half of said second pair of spur driven gear halves mounted on said driven shaft;

a thrust bearing mounted on said driven shaft for axial movement on said driven shaft, said thrust bearing located on said driven between the second spur driven gear half of said first pair of spur driven gear halves and the first spur driven gear half of said second pair of spur driven gear halves.

17. A gear transmission according to claim 15 further comprising:

at least three sets of spur gears comprising: a first set of spur gears comprising a first pair of spur drive gear halves and a first pair of spur driven gear halves;

a second set of spur gears comprising a second pair of spur drive gear halves and a second pair of spur driven gear halves;

a third set of spur gears comprising a third pair of spur drive gear halves and a third pair of spur driven gear halves;

the second spur driven gear half of said first pair of spur driven gear halves mounted on said driven shaft adjacent the first spur driven gear half of said second pair of spur driven gear halves mounted on said driven shaft;

a thrust bearing mounted on said driven shaft for axial movement of said thrust bearing on said driven shaft, said thrust bearing located on said driven shaft between the second spur driven gear half of said first pair of spur driven gear halves and the first spur driven gear half of said second pair of spur driven gear halves;

the second spur driven gear half of said second pair of spur driven gear halves mounted on said driven shaft adjacent the first spur driven gear half of said third pair of driven gear halves mounted on said driven shaft;

another thrust bearing mounted on said driven shaft for axial movement of said another thrust bearing on said driven shaft, said another thrust bearing located on said driven shaft between the second spur driven gear half of said second pair of spur driven gear halves and the first spur driven gear half of said third pair of spur driven gear halves.

18. A gear transmission according to claim 14, comprising a plurality of sets of spur gears.

19. A gear transmission according to claim 14, further comprising:

two sets of spur gears;

said spline helical cut drive shaft comprising a first spline helical cut drive shaft part torsionally joined to a second spline helical cut drive shaft part;

said spline helical cut driven shaft comprising a first spline helical cut driven shaft part torsionally joined to a second spline helical cut driven shaft part.

20. A gear transmission according to claim 14, further comprising:

at least three sets of spur gears; said spline helical cut drive shaft comprising a first spline helical cut drive shaft part torsionally joined to a second spline helical cut drive shaft part, and said second spline helical cut drive shaft part torsionally joined to a third spline helical cut drive shaft part; said spline helical cut driven shaft comprising a first spline helical cut driven shaft part torsionally joined to a second spline helical cut driven shaft part, and said second spline helical cut driven shaft part torsionally joined to a third spline helical cut driven shaft part.

21. A gear transmission according to claim 14 further comprising:

outer diameter D1 of the helical cut of the spline on the drive shaft adjacent to the first end of the drive shaft is equal to outer diameter D1A of the helical cut of the spline on the drive shaft adjacent to the second end of the drive shaft;

outer diameter D2 of the helical cut of the spline on the drive shaft adjacent to the helical cut of the spline on the drive shaft having outer diameter D1 is equal to outer diameter D2A of the helical cut of the spline on the drive shaft adjacent to the helical cut of the spline on the drive shaft having outer diameter D1A;

wherein outer diameter D2 is greater than outer diameter D1; and wherein outer diameter D2A is greater than outer diameter D1A.

22. A gear transmission according to claim 21 further comprising:
- at least three sets of spur gears;
- outer diameter D3 of the helical cut of the spline on the drive shaft adjacent to the helical cut of the spline on the drive shaft having outer diameter D2 is equal to outer diameter D3A of the helical cut of the spline on the drive shaft adjacent to the helical cut of the spline on the drive shaft having outer diameter D2A;
- wherein outer diameter D3 is greater than outer diameter D2; and
- wherein outer diameter D3A is greater than outer diameter D2A.

23. A gear transmission according to claim 21 further comprising:
- outer diameter D1 of the helical cut of the spline on the driven shaft adjacent to the first end of the driven shaft is equal to outer diameter D1A of the helical cut of the spline on the driven shaft adjacent to the second end of the driven shaft;
- outer diameter D2 of the helical cut of the spline on the driven shaft adjacent to the helical cut of the spline on the driven shaft having outer diameter D1 is equal to outer diameter D2A of the helical cut of the spline on the driven shaft adjacent to the helical cut of the spline on the driven shaft having outer diameter D1A;
- wherein outer diameter D2 is greater than outer diameter D1; and
- wherein outer diameter D2A is greater than outer diameter D1A.

24. A gear transmission according to claim 23 further comprising:
- at least three sets of spur gears;
- outer diameter D3 of the helical cut of the spline on the driven shaft adjacent to the helical cut of the spline on the driven shaft having outer diameter D2 is equal to outer diameter D3A of the helical cut of the spline on the driven shaft adjacent to the helical cut of the spline on the driven shaft having outer diameter D2A;
- wherein outer diameter D3 is greater than outer diameter D2; and
- wherein outer diameter D3A is greater than outer diameter D2A.

25. A gear transmission comprising:
- a drive shaft having a first end, a second end and an axis;
- a spline helical cut driven shaft disposed parallel to said drive shaft, said spline helical cut driven shaft having a first end, a second end and an axis, wherein the axis of said spline helical cut driven shaft is parallel to the axis of said drive shaft;
- at least two sets of spur gears, each set of spur gears comprising: a pair of spur drive gears mounted on said drive shaft for rotation by said drive shaft;
- a pair of spur driven gears mounted on said spline helical cut driven shaft for rotation by and, when necessary, axial movement on, said spline helical cut driven shaft;
- said pair of spur drive gears of each set comprising a first spur drive gear half and a second spur drive gear half;
- said pair of spur driven gears of each set comprising a first spur driven gear half and a second spur driven gear half;
- said first spur drive gear half of each set engaging said first spur driven gear half of each set for rotating said first spur driven gear half of each set and said second spur drive gear half of each set engaging said second spur driven gear half of each set for rotating said second spur driven gear half of each set;
- said first spur driven gear half of each set being a first cylindrical member having a first helical cut spline provided on an inner diameter of said first spur driven gear half cylindrical member, with said inner diameter first helical cut spline of said first spur driven gear half cylindrical member engaging an outer diameter of said drive shaft for rotation of said spline helical cut driven shaft by rotation of said first spur driven gear half and for permitting axial movement of said first spur driven gear half on said spline helical cut driven shaft;
- said second spur driven gear half of each set being a second cylindrical member having a second helical cut spline provided on an inner diameter of said second spur driven gear half cylindrical member, with said inner diameter second helical cut spline of said second spur driven gear half cylindrical member engaging a second helical cut spline provided on an outer diameter of said spline helical cut driven shaft for rotation of said spline helical cut driven shaft by rotation of said second spur driven gear half and for permitting axial movement of said second spur driven gear half on said spline helical cut driven shaft;
- wherein said helical cut splines are selected whereby said first spur driven gear half of each set and said second spur driven gear half of each set move axially on said spline helical cut driven shaft toward one another on said spline helical cut driven shaft in response to rotation of said spline helical cut driven shaft.

26. A gear transmission according to claim 25 further comprising: a thrust bearing mounted on said spline helical cut driven shaft for axial movement on said spline helical cut driven shaft, said thrust bearing located on said spline helical cut driven shaft between said first spur driven gear half and said second spur driven gear half of each set of spur gears.

27. A gear transmission according to claim 25 further comprising:
- two sets of spur gears comprising a first set of spur gears and a second set of spur gears; said pair of spur drive gear halves of said first set of spur gears mounted as a unit on said drive shaft at a fixed spaced apart axial location with respect to one another and further mounted on a first helical cut spline provided on an outer diameter of said drive shaft for axial movement together as a pair on said drive shaft; said pair of spur drive gear halves of said second set of spur gears mounted as a unit on said drive shaft at a fixed spaced apart axial location with respect to one another and further mounted on a second helical cut spline provided on said outer diameter of said drive shaft for axial movement together as a pair on said drive shaft;
- wherein said first helical cut spline and said second helical cut spline on said outer diameter of said drive shaft are selected whereby said pair of spur drive gear halves of said first set of spur gears and said pair of spur drive gear halves of said second set of spur gears move axially on said drive shaft toward one another in response to rotation of said drive shaft.

28. A gear transmission according to claim 25 further comprising:
- said first spur drive gear half of each set being a first cylindrical member having a first helical cut spline provided on an inner diameter of said first spur drive gear half cylindrical member, with said inner diameter first helical cut spline of said first spur drive gear half cylindrical member engaging a first helical cut spline provided on an outer diameter of said drive shaft for rotation of said first spur drive gear half by rotation of said drive shaft and for permitting axial movement of said first spur drive gear half on said drive shaft;

said second spur drive gear half of each set being a second cylindrical member having a second helical cut spline provided on an inner diameter of said second spur drive gear half cylindrical member, with said inner diameter second helical cut spline of said second spur drive gear half cylindrical member engaging a second helical cut spline provided on an outer diameter of said drive shaft for rotation of said second spur drive gear half by rotation of said drive shaft and for permitting axial movement of said second spur drive gear half on said drive shaft;

wherein said helical cut splines are selected whereby said first spur drive gear half of each set and said second spur drive gear half of each set move axially away from one another on said drive shaft in response to rotation of said drive shaft.

29. A gear transmission according to claim 28 further comprising:

a first retainer member located at a fixed axial location on said drive shaft adjacent said first end of said drive shaft and a second retainer member located at a fixed axial location on said drive shaft adjacent said second end of said drive shaft with said spur drive gear halves of each set located on said drive shaft between said first and second retainer members of said drive shaft;

said drive shaft first and second retainer members being spaced from one another at a distance in the axial direction of said drive shaft to permit axial movement of said spur drive gear halves of each set on said drive shaft in the axial direction of said drive shaft and to prevent said spur drive gear halves of each set from disengaging respective spur driven gear halves.

30. A gear transmission according to claim 29 further comprising: two sets of spur gears comprising: a first set of spur gears comprising a first pair of spur drive gear halves and a first pair of spur driven gear halves;

a second set of spur gears comprising a second pair of spur drive gears halves and a second pair of spur driven gear halves;

the first spur drive gear half of said first pair of spur drive gear halves mounted on said drive shaft adjacent to said first retainer member located on said drive shaft;

the second spur drive gear half of said second pair of spur drive gear halves mounted on said drive shaft adjacent to said second retainer member located on said drive shaft;

the second spur drive gear half of said first pair of spur drive gear halves mounted on said drive shaft adjacent the first spur drive gear half of said second pair of spur drive gear halves mounted on said drive shaft;

a thrust bearing mounted on said drive shaft for axial movement of said thrust bearing on said drive shaft, said thrust bearing located on said drive shaft between the second spur drive gear half of said first pair of spur drive gear halves and the first spur drive gear half of said second pair of spur drive gear halves.

31. A gear transmission according to claim 29 further comprising: at least three sets of spur gears comprising: a first set of spur gears comprising a first pair of spur drive gear halves and a first pair of spur driven gear halves;

a second set of spur gears comprising a second pair of spur drive gear halves and a second pair of spur driven gear halves;

a third set of spur gears comprising a third pair of spur drive gear halves and a third pair of spur driven gear halves;

the second spur drive gear half of said first pair of spur drive gear halves mounted on said drive shaft adjacent the first spur drive gear half of said second pair of spur drive gear halves mounted on said drive shaft; a thrust bearing mounted on said drive shaft for axial movement of said thrust bearing on said drive shaft, said thrust bearing located on said drive shaft between the second spur drive gear half of said first pair of spur drive gear halves and the first spur drive gear half of said second pair of spur drive gear halves;

the second spur drive gear half of said second pair of spur drive gear halves mounted on said drive shaft adjacent the first spur drive gear half of said third pair of drive gear halves mounted on said drive shaft;

another thrust bearing mounted on said drive shaft for axial movement of said another thrust bearing on said drive shaft, said another thrust bearing located on said drive shaft between the second spur drive gear half of said second pair of spur drive gear halves and the first spur drive gear half of said third pair of spur drive gear halves.

32. A gear transmission according to claim 28, comprising a plurality of sets of spur gears.

33. A gear transmission according to claim 28, further comprising:

two sets of spur gears;

said spline helical cut drive shaft comprising a first spline helical cut drive shaft part torsionally joined to a second spline helical cut drive shaft part;

said spline helical cut driven shaft comprising a first spline helical cut driven shaft part torsionally joined to a second spline helical cut driven shaft part.

34. A gear transmission according to claim 28, further comprising:

at least three sets of spur gears; said spline helical cut drive shaft comprising a first spline helical cut drive shaft part torsionally joined to a second spline helical cut drive shaft part, and said second spline helical cut drive shaft part torsionally joined to a third spline helical cut drive shaft part; said spline helical cut driven shaft comprising a first spline helical cut driven shaft part torsionally joined to a second spline helical cut driven shaft part, and said second spline helical cut driven shaft part torsionally joined to a third spline helical cut driven shaft part.

35. A gear transmission according to claim 28 further comprising:

outer diameter D1 of the helical cut of the spline on the drive shaft adjacent to the first end of the drive shaft is equal to outer diameter D1A of the helical cut of the spline on the drive shaft adjacent to the second end of the drive shaft;

outer diameter D2 of the helical cut of the spline on the drive shaft adjacent to the helical cut of the spline on the drive shaft having outer diameter D1 is equal to outer diameter D2A of the helical cut of the spline on the drive shaft adjacent to the helical cut of the spline on the drive shaft having outer diameter D1A;

wherein outer diameter D2 is greater than outer diameter D1; and wherein outer diameter D2A is greater than outer diameter D1A.

36. A gear transmission according to claim 35 further comprising:

at least three sets of spur gears;

outer diameter D3 of the helical cut of the spline on the drive shaft adjacent to the helical cut of the spline on the drive shaft having outer diameter D2 is equal to outer diameter D3A of the helical cut of the spline on the drive shaft adjacent to the helical cut of the spline on the drive shaft having outer diameter D2A;

wherein outer diameter D3 is greater than outer diameter D2; and wherein outer diameter D3A is greater than outer diameter D2A.

37. A gear transmission according to claim 35 further comprising:

outer diameter D1 of the helical cut of the spline on the driven shaft adjacent to the first end of the driven shaft is equal to outer diameter D1A of the helical cut of the spline on the driven shaft adjacent to the second end of the driven shaft;

outer diameter D2 of the helical cut of the spline on the driven shaft adjacent to the helical cut of the spline on the driven shaft having outer diameter D1 is equal to outer diameter D2A of the helical cut of the spline on the driven shaft adjacent to the helical cut of the spline on the driven shaft having outer diameter D1A;

wherein outer diameter D2 is greater than outer diameter D1; and wherein outer diameter D2A is greater than outer diameter D1A.

38. A gear transmission according to claim 37 further comprising:

at least three sets of spur gears;

outer diameter D3 of the helical cut of the spline on the driven shaft adjacent to the helical cut of the spline on the driven shaft having outer diameter D2 is equal to outer diameter D3A of the helical cut of the spline on the driven shaft adjacent to the helical cut of the spline on the driven shaft having outer diameter D2A;

wherein outer diameter D3 is greater than outer diameter D2; and wherein outer diameter D3A is greater than outer diameter D2A.

* * * * *